US012264500B2

(12) United States Patent
Hiremath et al.

(10) Patent No.: US 12,264,500 B2
(45) Date of Patent: Apr. 1, 2025

(54) LOCK STATUS INDICATORS

(71) Applicant: Schlage Lock Company LLC, Carmel, IN (US)

(72) Inventors: Gururaj Amaresh Hiremath, Badami (IN); Akhil Ramesh Hamsagar, Bangalore (IN); Steven Verderaime, Colorado Springs, CO (US); Eric Drummond, Divide, CO (US); Jaime Sandoval, Jr., Colorado Springs, CO (US); Stephen Couch, Woodland Park, CO (US)

(73) Assignee: Schlage Lock Company LLC, Carmel, IN (US)

( * ) Notice: Subject to any disclaimer, the term of this patent is extended or adjusted under 35 U.S.C. 154(b) by 235 days.

(21) Appl. No.: 17/834,271

(22) Filed: Jun. 7, 2022

(65) Prior Publication Data

US 2023/0392413 A1 Dec. 7, 2023

(51) Int. Cl.
*E05B 41/00* (2006.01)
*E05B 17/22* (2006.01)

(52) U.S. Cl.
CPC .............. *E05B 41/00* (2013.01); *E05B 17/22* (2013.01)

(58) Field of Classification Search
CPC ........ E05B 41/00; E05B 63/04; E05B 63/042; E05B 63/0065; E05B 17/22; E05B 9/002; E05B 39/00
See application file for complete search history.

(56) References Cited

U.S. PATENT DOCUMENTS 1,749,649 A * 3/1930 Rolph ..................... E05B 41/00 70/438
2,455,208 A * 11/1948 Wirth ..................... E05B 41/00 40/907

(Continued)

FOREIGN PATENT DOCUMENTS

AU 2020202956 A1 12/2020

OTHER PUBLICATIONS

Schlage; L9000-Series 180 degree indicator installation instructions—escutcheon trim; L-Series service manual; p. 219.
Sargent Assa Abloy; 7800 & 8200 Series Mortise Lock, Used with VN1 Escutcheon Trim and V Series Indicators; Installation Instructions; 8 pages; Copyright 2019, 2020, 2021, 2022 Sargent Manufacturing Company.

(Continued)

*Primary Examiner* — Alyson M Merlino
(74) *Attorney, Agent, or Firm* — Taft Stettinius & Hollister LLP

(57) ABSTRACT

An example trim generally includes an escutcheon, an indicator plate, a cam, and a backplate. The indicator plate is movably mounted in the escutcheon, and has a first position in which a first indicium is aligned with an escutcheon window of the escutcheon, and a second position in which a second indicium is aligned with the escutcheon window. The cam is rotatably mounted in the escutcheon for rotation between a first handing orientation and a second handing orientation. The cam is operable to move the indicator plate between the first position and the second position when the cam is in each of the handing orientations. The backplate is coupled to the escutcheon and at least partially encloses the indicator plate within the escutcheon. The cam is operable to rotate between the first handing orientation and the second handing orientation while the backplate remains coupled to the escutcheon.

17 Claims, 22 Drawing Sheets

(56) References Cited

U.S. PATENT DOCUMENTS

| | | | | |
|---|---|---|---|---|
| 5,658,026 | A * | 8/1997 | Nigro, Jr. | E05B 13/002 70/210 |
| 5,841,347 | A * | 11/1998 | Kim | E05B 47/0692 70/462 |
| 6,491,327 | B1 * | 12/2002 | Fan | E05B 15/02 292/336.3 |
| 9,169,669 | B2 * | 10/2015 | Clary | E05B 41/00 |
| 9,464,458 | B2 * | 10/2016 | Huang | E05B 1/003 |
| 11,359,408 | B2 * | 6/2022 | Kim | E05B 41/00 |
| 11,486,163 | B2 * | 11/2022 | Sweeney | E05B 41/00 |
| 2011/0016938 | A1 * | 1/2011 | Chi | E05B 41/00 70/432 |
| 2015/0240526 | A1 | 8/2015 | Clary et al. | |
| 2015/0315816 | A1 | 11/2015 | Gopalakrishnan et al. | |
| 2019/0323264 | A1 * | 10/2019 | Lunday | E05B 41/00 |
| 2021/0164267 | A1 | 6/2021 | Holtgrewe et al. | |

OTHER PUBLICATIONS

Corbin Russwin Assa Abloy; ML2000 Series Mortise Lock, Used with VN Escutcheon Trim and V Series Indicators; Installation Instructions; 12 pages; Copyright 2019, 2020, 2021 Assa Abloy.

Yale; 8800 Series Mortise Lock, Used with Sectional Trim and V Series Indicators; Installation Instructions; 8 pages; Copyright 2020 Assa Abloy.

Allegion; Schlage L Series Service Manual; 196 pages; Copyright 2021 Allegion.

International Search Report, International Searching Authority, International Application No. PCT/US2023/024706, Nov. 30, 2023, 4 pages.

Written Opinion of the International Searching Authority, International Searching Authority, International Application No. PCT/US2023/024706, Nov. 30, 2023, 8 pages.

* cited by examiner

LOCK STATUS INDICATORS

TECHNICAL FIELD

The present disclosure generally relates to status indicators for locksets, and more particularly but not exclusively relates to mortise lockset trims including status indicators.

BACKGROUND

Locksets are occasionally provided with status indicators to indicate the locked/unlocked state of the lockset. However, many conventional status indicators suffer from a variety of drawbacks and/or limitations, such as those relating to visibility of the indicator and/or ease of installation. For these reasons among others, there remains a need for further improvements in this technological field.

SUMMARY

An example trim generally includes an escutcheon, an indicator plate, a cam, and a backplate. The indicator plate is movably mounted in the escutcheon, and has a first position in which a first indicium is aligned with an escutcheon window of the escutcheon, and a second position in which a second indicium is aligned with the escutcheon window. The cam is rotatably mounted in the escutcheon for rotation between a first handing orientation and a second handing orientation. The cam is operable to move the indicator plate between the first position and the second position when the cam is in each of the handing orientations. The backplate is coupled to the escutcheon and at least partially encloses the indicator plate within the escutcheon. The cam is operable to rotate between the first handing orientation and the second handing orientation while the backplate remains coupled to the escutcheon. Further embodiments, forms, features, and aspects of the present application shall become apparent from the description and figures provided herewith.

DETAILED DESCRIPTION OF ILLUSTRATIVE EMBODIMENTS

Figure 1:
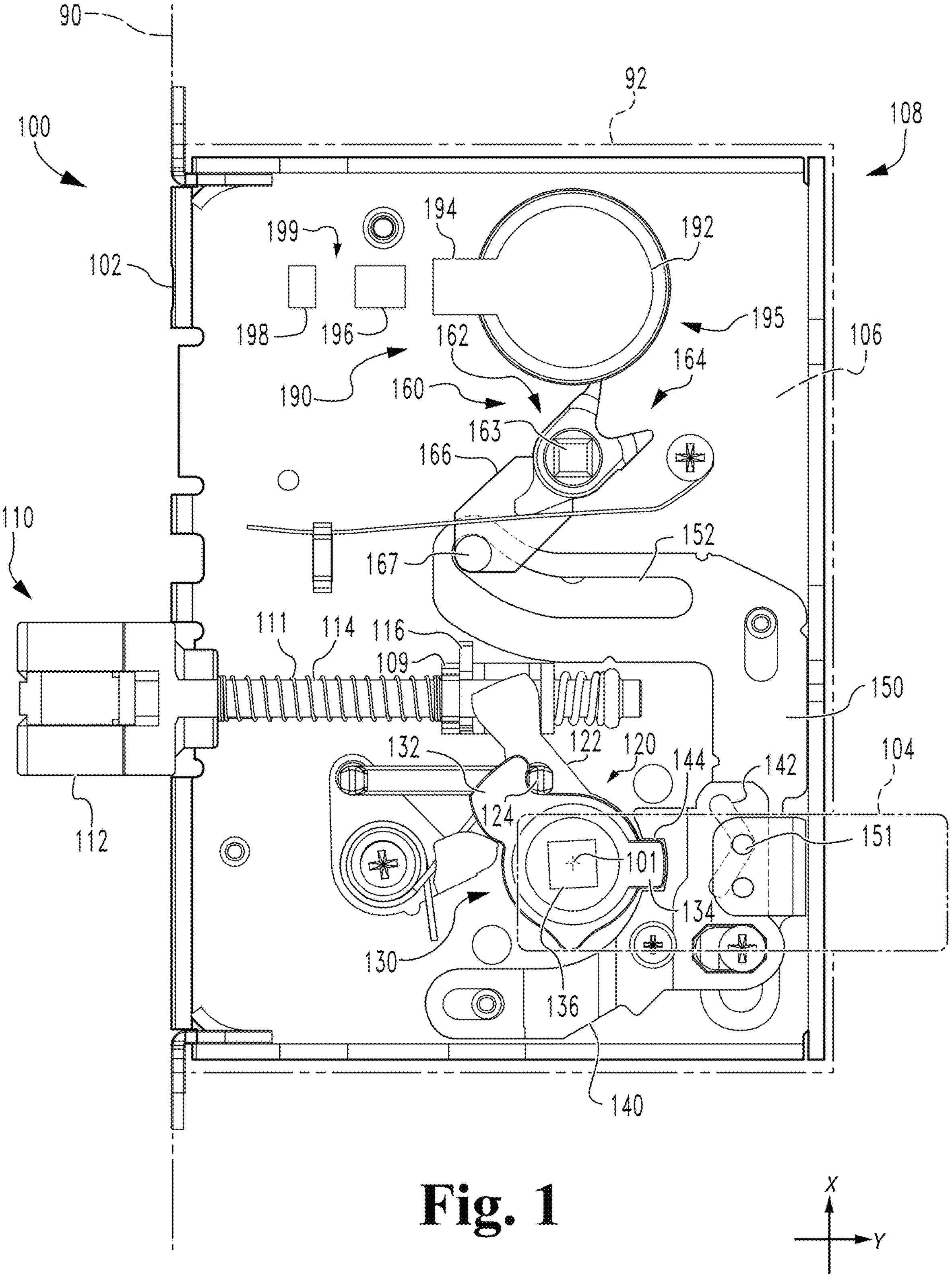
FIG. 1 is a plan view of a mortise chassis according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" may be used to denote motion or spacing along three mutually perpendicular axes, wherein each of the axes defines two opposite directions. In the coordinate system illustrated in FIG. 1, the X-axis defines first and second lateral directions, the Y-axis defines first and second longitudinal directions, and the Z-axis (into and out of the plane of the page) defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Moreover, the term "transverse" may also be used to describe motion or spacing that is non-parallel to a particular axis or direction. For example, an element that is described as being "movable in a direction transverse to the longitudinal axis" may move in a direction that is perpendicular to the longitudinal axis and/or in a direction oblique to the longitudinal axis. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a mortise chassis 100 according to certain embodiments. The mortise chassis 100 is configured for mounting in a mortise pocket 92 of a door 90, and generally includes a case 102, a latchbolt 110 movably mounted in the case 102, a retractor 120 operable to retract the latchbolt 110, a hub 130 operable to drive the retractor 120, a catch 140 operable to selectively prevent rotation of the hub 130, a link 150 operable to drive the catch 140 between a locking position and an unlocking position, and a turnhub 160 operable to drive the link 150 between a lock-setting position and an unlock-setting position. As described herein, the hub 130 is configured for connection with a handle 104 such that the handle 104 is at least selectively operable to retract the latchbolt 110. The mortise chassis 100 further includes a cover 106, which together with the case 102 define a housing 108 of the mortise chassis 100.

The latchbolt 110 is slidably mounted in the housing 108 for lateral movement between an extended position, in which the latchbolt 110 is operable to retain the door 90 in a closed position, and a retracted position, in which the latchbolt 110 is inoperable to retain the door 90 in the closed position. The latchbolt 110 may be biased toward its extended position, for example by a spring 111 engaged with an anchor 109 of the housing 108. The latchbolt 110 generally includes a bolt head 112, a stem 114 extending rearward from the bolt head 112, and a bracket 116 secured to the stem 114.

The retractor 120 is pivotably mounted in the housing 108 for pivotal movement about a rotational axis 101, and is engaged with the bracket 116 such that rotation of the retractor 120 from a home position to a rotated position retracts the latchbolt 110. More particularly, the retractor 120 includes an arm 122 that engages the bracket 116 during such rotation of the retractor 120 to thereby drive the latchbolt 110 from its extended position to its retracted position against the biasing of the spring 111.

The hub 130 is mounted in the case 102 for rotation about the rotational axis 101, and may be rotationally coupled with a handle 104 such that a user is able to rotate the hub 130 by rotating the handle 104. The hub 130 includes a finger 132 operable to engage an extension 124 such that rotation of the hub 130 in an actuating direction (clockwise in FIG. 1) pivots the retractor 120 for retraction of the latchbolt 110. The illustrated hub 130 also includes a protrusion 134 operable to engage the catch 140. While only one hub 130 is visible in the illustration of FIG. 1, it should be appreciated that a second hub may be present for coupling with a second handle on the opposite side of the door 90. In such forms, the first and second hubs may be independently rotatable.

The catch 140 is slidably mounted for lateral movement within the case 102, and generally includes a cam slot 142 through which the catch 140 is engaged with the link 150, and a recess 144 operable to receive the protrusion 134. The cam slot 142 receives a pin 151 coupled to the link 150, and is angled relative to the longitudinal and lateral directions such that the pin 151 laterally drives the catch 140 between its locking position and its unlocking position as the link 150 moves longitudinally between its lock-setting position and its unlock-setting position. When the catch 140 is in its locking position (FIG. 1), the protrusion 134 is received in the recess 144 such that the catch 140 prevents rotation of the hub 130, thereby defining a locked state of the mortise chassis 100. When the catch 140 is shifted toward its unlocking position (to the right in FIG. 1), the recess 144 is removed from engagement with the protrusion 134 such that the catch 140 does not prevent rotation of the hub 130, thereby defining an unlocked state of the mortise chassis 100.

In the illustrated form, the hub 130 includes a protrusion 134, and the catch 140 includes a recess 144 operable to receive the protrusion 134. It is also contemplated that these features may be reversed such that the hub 130 includes a recess, and a portion of the catch 140 projects into the recess to selectively lock the hub 130 against rotation. Moreover, in embodiments in which the mortise chassis 100 includes two hubs, the catch 140 may be operable to engage one of the hubs (e.g., the outside or non-egress side hub), and may be inoperable to engage the other of the hubs (e.g., the inside or egress-side hub). The hub 130 is configured for coupling with the handle 104, and may, for example, include a recess 136 configured to receive a spindle of the handle 104.

The link 150 is slidably mounted for longitudinal movement within the housing 108, and includes the pin 151, which extends into the cam slot 142. As a result of this association, longitudinal movement of the link 150 between its lock-setting first position and its unlock-setting second position laterally drives the catch 140 between its locking position and its unlocking position as described above. The link 150 further includes an actuation slot 152 that interfaces with the turnhub 160 such that the turnhub 160 is operable to move the link 150 between its lock-setting position and its unlock-setting position.

The turnhub 160 is rotatably mounted in the case 102, and generally includes a body portion 162, a fork 164 projecting from one side of the body portion 162, and an arm 166 projecting from another side of the body portion 162. The body portion 162 is configured for coupling with a turnpiece mounted to the interior or egress side of the door 90 such that the user is able to rotate the turnhub 160 by rotating the turnpiece. In the illustrated form, the body portion 162 includes a recess 163 operable to receive a stem of the turnpiece. The fork 164 is configured to be engaged by a cam of a lock cylinder that is accessible from the exterior or non-egress side of the door 90 such that the user is able to rotate the turnhub 160 by actuating the lock cylinder.

Rotation of the turnhub 160 (e.g., by the turnpiece and/or the lock cylinder) causes a post 167 of the arm 166 to travel within the actuation slot 152 to thereby longitudinally move the link 150 between its lock-setting position and its unlock-setting position. The turnhub 160 thus has a first or home position in which the turnhub 160 sets the link 150 to its lock-setting position (thereby locking the mortise chassis 100), and a second or rotated position in which the turnhub 160 sets the link to its unlock-setting position (thereby unlocking the mortise chassis 100).

The case 102 also includes a mounting location 190 operable to receive a lock cylinder and/or a dummy cylinder of a trim that also includes the handle 104. The mounting location 190 generally includes a circular portion 192, a slot 194 extending from the circular portion 192, a first aperture 196 aligned with the slot 194, and a second aperture 198 aligned with the slot 194 and the first aperture 196. The circular portion 192 and the slot 194 are connected with one another, and may be considered to define an aperture 195. As described herein, the mounting location 190 may facilitate coupling of the mortise chassis 100 with the trim to thereby reduce wobble and/or displacement of the trim relative to the mortise chassis 100. While the mounting location 190 is illustrated as being provided in the case 102, it is also contemplated that the mounting location 190 may additionally or alternatively be provided in the cover plate 106 that covers the case 102 to thereby enclose the internal components of the mortise chassis 100.

Figure 2:
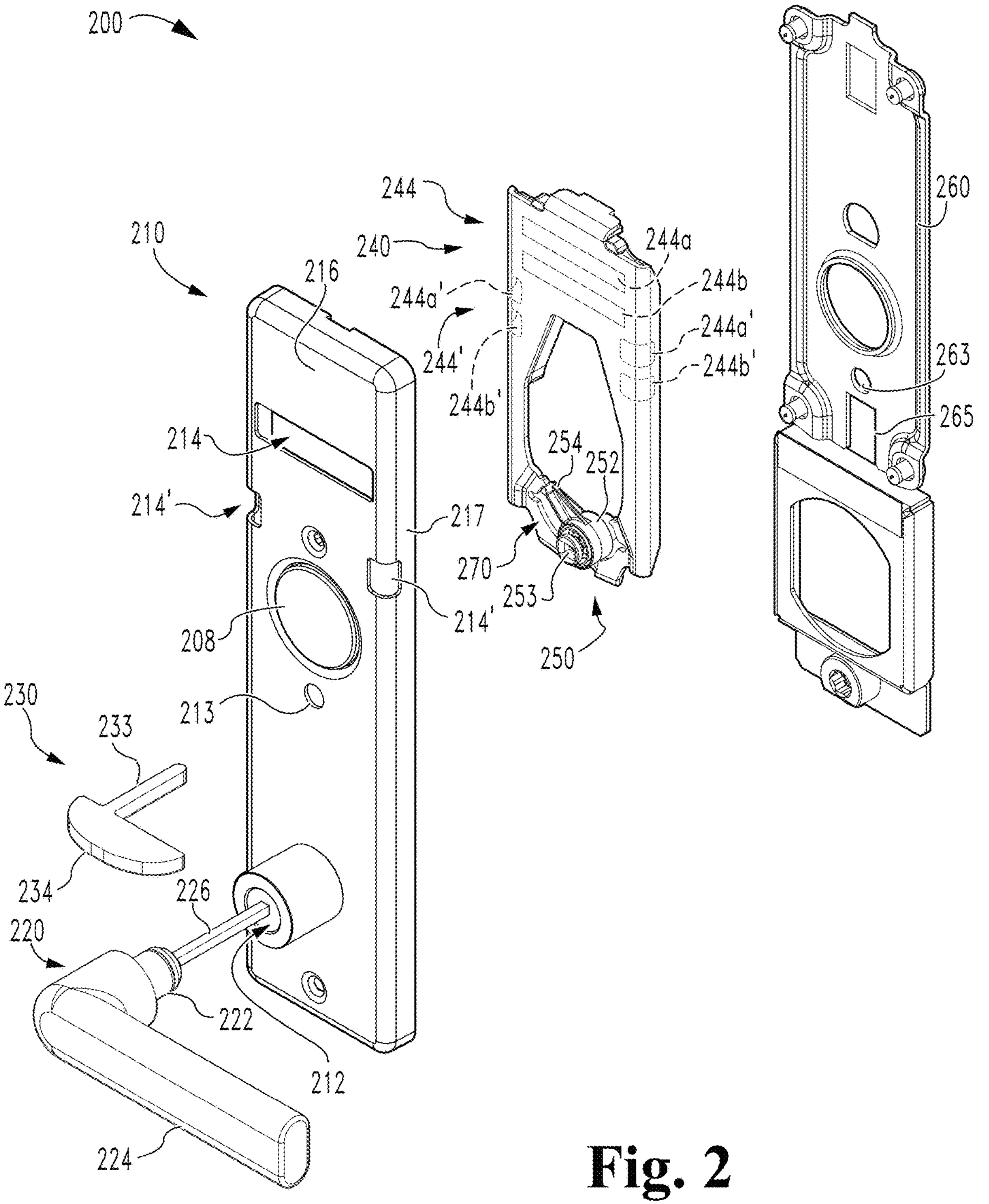
FIG. 2 is an exploded assembly view of a handed trim according to certain embodiments.

With additional reference to FIG. 2, illustrated therein is a handed trim 200 according to certain embodiments. The trim 200 may, for example, be utilized in connection with the mortise chassis 100 illustrated in FIG. 1. The trim 200 generally includes an escutcheon 210, a handle 220 rotatably mounted to the escutcheon 210, a turnpiece 230 rotatably mounted to the escutcheon 210, an indicator plate 240 slidably mounted within the escutcheon 210, a cam 250 rotatably mounted in the escutcheon 210 and engaged with the indicator plate 240, and a backplate 260 that encloses the indicator plate 240 within the escutcheon 210. As described herein, when the trim 200 is installed to the mortise chassis 100, the handle 220 is at least selectively operable to retract the latchbolt 110, the turnpiece 230 is operable to rotate the turnhub 160 between its home position and its rotated position to thereby change the locked/unlocked state of the mortise chassis 100, and the indicator plate 240 is configured to provide a visual indication regarding the locked/unlocked state of the mortise chassis 100.

In certain embodiments, the trim 200 may further include a cylinder 208 that extends beyond the rear plane of the escutcheon 210 and is operable to extend into the circular portion 192 of the mounting location 190. In the illustrated form, the cylinder 208 is a dummy cylinder that may, for example, be provided along the lines described below with reference to the trim 600 illustrated in FIGS. 20 and 21. It is also contemplated that the cylinder 208 may be an active lock cylinder operable to rotate the turnhub 160 when actuated by an appropriate key.

The escutcheon 210 is configured for mounting to the door 90, and generally includes a handle aperture 212 through which a spindle 226 of the handle 220 extends, a turnpiece aperture 213 through which a stem 233 of the turnpiece 230 extends, and at least one window through which at least one portion of the indicator plate 240 is visible. More particularly, the illustrated escutcheon 210 includes a primary window 214 and a pair of secondary windows 214'. As described herein, the indicator plate 240 includes indicia 244, 244' that selectively align with the windows 214, 214' to provide a visual indication regarding the locked/unlocked state of the mortise chassis 100. The primary window 214 is formed in a front face 216 of the escutcheon 210, and each of the secondary windows 214' is formed at least partially in a sidewall 217 of the escutcheon 210. As a result, when the door 90 is closed, the visual indications provided by the indicator plate 240 are visible throughout at least a 180° viewing range.

The handle 220 is rotatably mounted to the escutcheon 210, and is one example of the above-described handle 104. While the illustrated handle 220 is provided in the form of a lever, it is also contemplated that the handle 220 may be provided in another form, such as that of a knob. The handle 220 includes a shank 222 and a grip 224 extending from the shank 222, and in the illustrated form further includes a spindle 226 that extends into the hub recess 136 to thereby rotationally couple the handle 220 with the hub 130.

The turnpiece 230 is rotatably mounted to the escutcheon 210, and generally includes a stem 233 and a grip 234 positioned on a proximal end of the stem 233. While the illustrated turnpiece 230 is provided in the form of a thumbturn, it is also contemplated that the turnpiece 230 may be provided in another form, such as one including a coin turn, an emergency turn, or a lock cylinder. In the illustrated form, the stem 233 extends through an opening 253 in the cam 250 and into the recess 163 in the turnhub 160 to thereby rotationally couple the turnpiece 230 with the turnhub 160 and the cam 250. It is also contemplated that the turnpiece 230 may be coupled with the turnhub 160 in another manner. As one example, the stem 233 may engage a spindle through which the cam 250 is coupled with the turnhub 160. An example of such a spindle 910 and a lockset 1000 including such a spindle 910 are described below with reference to FIGS. 28 and 29.

The indicator plate 240 is slidably mounted in the escutcheon 210 for movement between a first position and a second position, and is engaged with the cam 250 such that the cam 250 is operable to drive the indicator plate 240 between its first position and its second position. In certain embodiments, the indicator plate 240 may be biased toward one of the first position or the second position, for example by a spring and/or by gravity. The indicator plate 240 includes at least one primary indicium 244, and may further include one or more secondary indicia 244'. The illustrated indicator plate 240 includes a first primary indicium **244*a* and a second primary indicium 244*b*, a pair of first secondary indicia 244*a*', and a pair of second secondary indicia 244*b*'. When the indicator plate 240 is in its first position, the first primary indicium 244*a* is visible via the primary window 214, and each of the first secondary indicia 244*a*' is visible via the corresponding secondary window 214'. When the indicator plate 240 is in its second position, the second primary indicium 244*b* is visible via the primary window 214, and each of the second secondary indicia 244*b*' is visible via the corresponding secondary window 214'**.

The indicia 244, 244' provided on the indicator plate 240 may take any of a number of forms, such as forms including letters, words, colors, symbols, and/or other indicia. In the illustrated form, the first indicia **244*a*, 244*a*' relate to the locked state of the mortise chassis 100, and the second indicia 244*b*, 244*b*' relate to the unlocked state of the mortise chassis 100. In certain forms, the primary indicia 244 may include words. For example, the first primary indicium 244*a* may include the word "LOCKED" and/or the word "SECURED", and the second primary indicium 244*b* may include the word "UNLOCKED" and/or the word "UNSECURED". The primary indicia 244 may additionally or alternatively include colors, symbols, and/or other indicia. In certain forms, the secondary indicia 244' may include symbols. For example, the first secondary indicium 244*a*' may include a symbol of a closed padlock, and the second secondary indicium 244*b*' may include a symbol of an open padlock. The secondary indicia 244' may additionally or alternatively include colors, symbols, and/or other indicia. In certain forms, one or more of the indicia 244, 244'** may be provided in the form of a blank space of a predetermined color.

In the illustrated form, the first indicia **244*a*, 244*a*' relate to the locked state, and are positioned above the second indicia 244*b*, 244*b*', which relate to the unlocked state. As described herein, the cam 250 is configured to place the indicator plate 240 in a lower first position to thereby cause the upper first indicia 244*a*, 244*a*' to align with the windows 214, 214' when the mortise chassis 100 is locked, and to place the indicator plate 240 in an upper second position to thereby cause the lower second indicia 244*b*, 244*b*' to align with the windows 214, 214' when the mortise chassis 100 is unlocked. It is also contemplated that this orientation may be reversed such that the locking indicia 244*a*, 244*a*' align with the windows 214, 214' when the indicator plate 240 is in an upper first position and such that the unlocking indicia 244*b*, 244*b*' align with the windows 214, 214' when the indicator plate 240** is in a lower second position.

Figure 3:
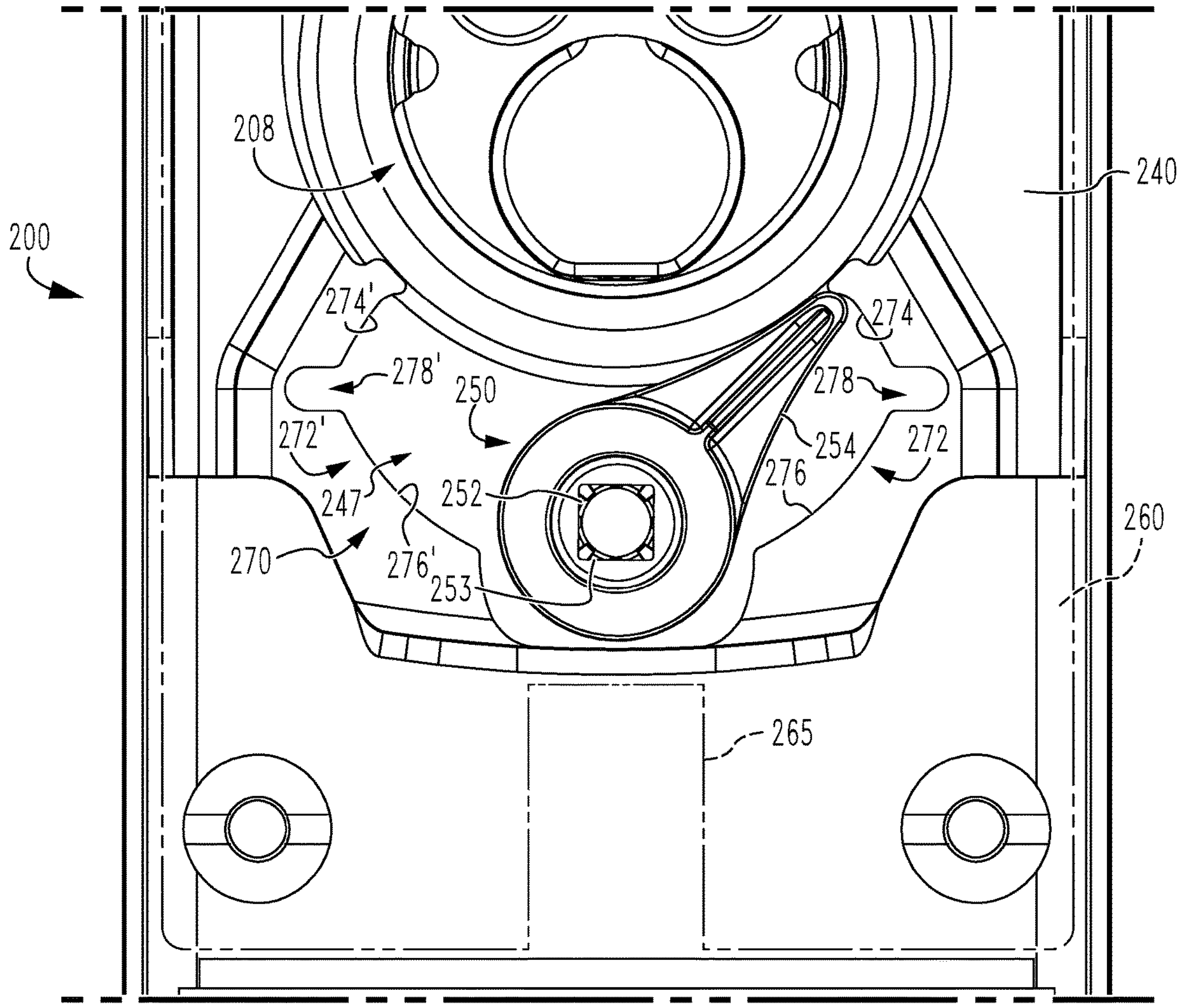
FIG. 3 is a rear view of the handed trim illustrated in FIG. 2, with a cam in a first unlocking position.

With additional reference to FIG. 3, the indicator plate 240 further includes a cam interface 270 through which the indicator plate 240 interfaces with the cam 250. The cam interface 270 generally includes a first interface portion 272 and a second interface portion 272'. The first interface portion 272 generally includes a first cam surface 274, a second cam surface 276, and a first notch 278 positioned between the first cam surface 274 and the second cam surface 276. In the illustrated form, the second interface portion 272' is a mirror image of the first interface portion 272, and generally includes a third cam surface 274' corresponding to the first cam surface 274, a fourth cam surface 276' corresponding to the second cam surface 276, and a second notch 278' corresponding to the first notch 278.

The cam 250 generally includes a body portion 252 and an arm 254 extending radially outward from the body portion 252. The body portion 252 includes an aperture 253 through which the stem 233 of the turnpiece 230 extends such that the cam 250 is rotationally coupled with the turnpiece 230 (and thus with the turnhub 160). As described herein, the arm 254 engages the cam interface 270 to drive the indicator plate 240 between its first position and its second position as the cam 250 rotates between a home position and a rotated position.

The backplate 260 is secured to the escutcheon 210 by one or more fasteners (e.g., rivets or screws), and aids in limiting the indicator plate 240 to movement between its first position and its second position. The backplate 260 includes an aperture 263 through which the stem 233 of the turnpiece 230 extends, and in the illustrated form further includes a window 265 such as a slot. As described herein, the window 265 may aid the user in adjusting the handing of the trim 200, and the backplate 260 may remain secured to the escutcheon 210 during such adjustment.

FIG. 3 illustrates the trim 200 in a first handing configuration, in which the cam 250 is in a first handing orientation. In the first handing configuration, the arm 254 of the cam 250 engages the first interface portion 272 to drive the indicator plate 240 between its first position and its second position. When the cam 250 is in the first unlocking position, which corresponds to the rotated position of the turnhub 160 and the unlocked state of the mortise chassis 100, the arm 254 is engaged with the first cam surface 274 and thereby retains the indicator plate 240 in its upper position. As noted above, in the illustrated embodiment, the upper position of the indicator plate 240 is the unlock-indicating position, in which the unlock indicia **244*b*, 244*b*' are aligned with the windows 214, 214'**.

Figure 4:
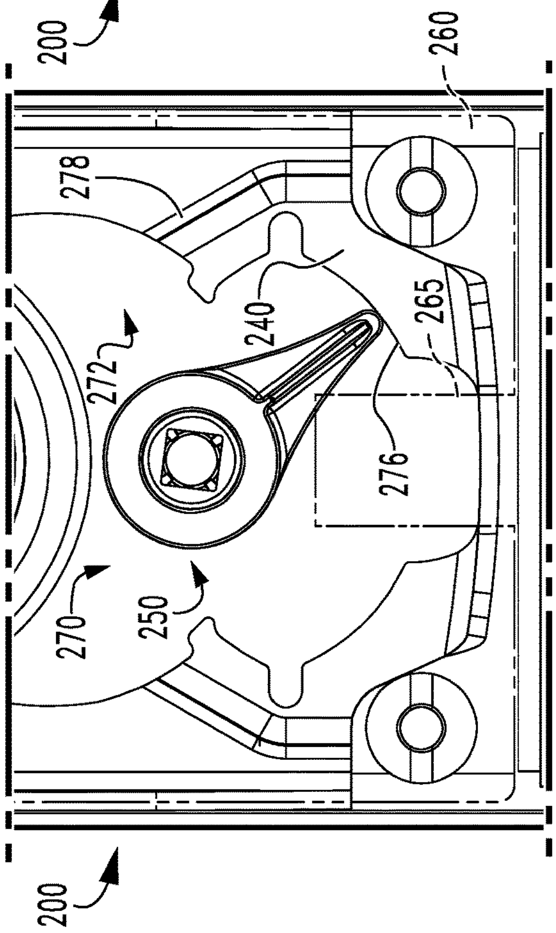
FIG. 4 is a rear view of the handed trim illustrated in FIG. 2, with the cam in a first locking position.

With additional reference to FIG. 4, rotation of the cam 250 in a locking direction (clockwise in FIGS. 3 and 4) from its first unlocking position (FIG. 3) to its first locking position (FIG. 4) causes the indicator plate 240 to move downward to its lower position. For example, a biasing force may urge the indicator plate 240 toward its lower position and/or the arm 254 may engage the second cam surface 276 to thereby drive the indicator plate 240 toward its lower position. As noted above, in the illustrated embodiment, the lower position of the indicator plate 240 is the lock-indicating position, in which the lock indicia **244*a*, 244*a*' are aligned with the windows 214, 214'**.

Figure 5:
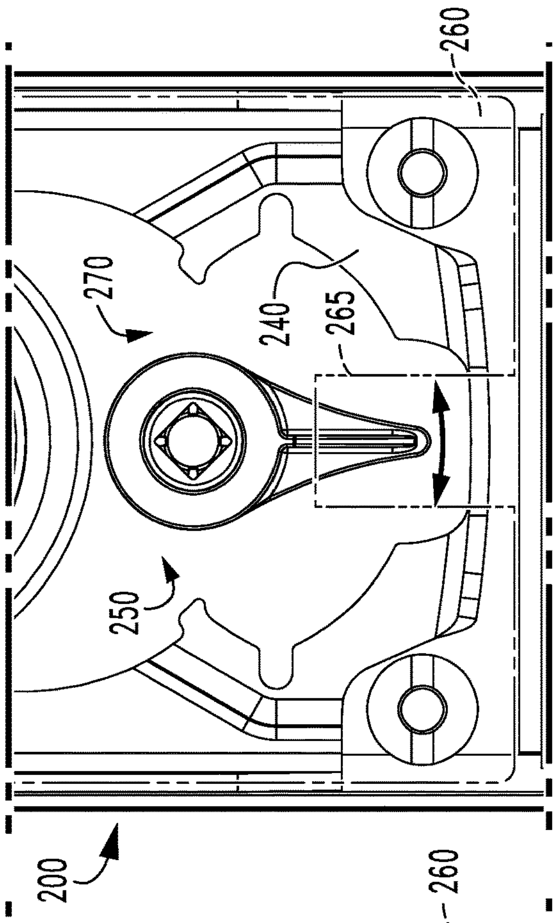
FIG. 5 is a rear view of the handed trim illustrated in FIG. 2, with the cam in a neutral position.
Figure 7:
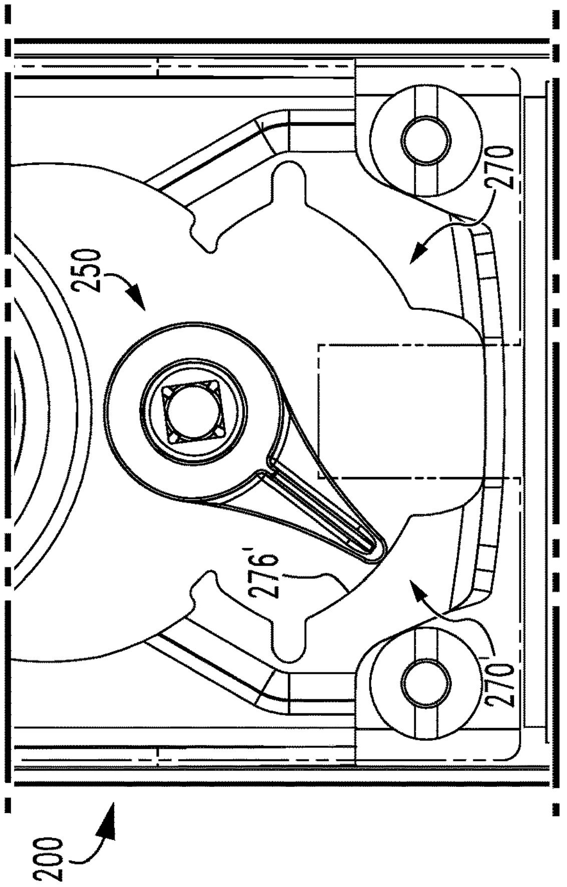
FIG. 7 is a rear view of the handed trim illustrated in FIG. 2, with the cam in a second locking position.
Figure 6:
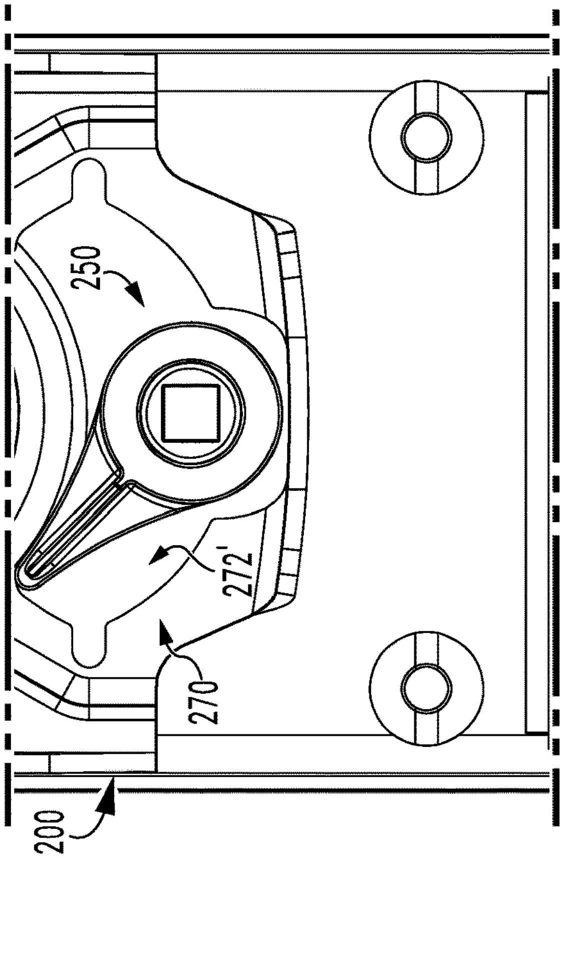
FIG. 6 is a rear view of the handed trim illustrated in FIG. 2, with the cam in a second unlocking position.

With additional reference to FIGS. 5-7, it may be the case that the user desires to change the handing of the trim 200 from the first handing configuration (FIGS. 3 and 4) to a second handing configuration (FIGS. 6 and 7) that is different from the first handing configuration. In order to do so, the user may simply rotate the cam 250 (e.g., by rotating the turnpiece 230) from its first handing orientation to its second handing orientation with the trim 200 removed from the mortise chassis 100. Rotation of the cam 250 in a first rotational direction (clockwise in FIGS. 3-7) drives the cam 250 from its first handing orientation (FIGS. 3 and 4) through a neutral position (FIG. 5) and to a second handing orientation (FIGS. 6 and 7).

At least a portion of the cam 250 is visible during at least a portion of the rotation of the cam 250 between the first handing orientation and the second handing orientation. In the illustrated form, the arm 254 of the cam 250 is visible via the window 265 in the backplate 260 as the cam 250 passes through the neutral position (FIG. 5). This may aid the user in ensuring that the cam 250 is rotating in the desired direction and toward the appropriate position. Moreover, due to the fact that the opening 247 defined by the cam interface 270 is large enough to accommodate the cam 250 during shifting of the indicator plate 240 and rotation of the cam 250 from its first handing orientation to its second handing orientation, the backplate 260 may remain coupled to the escutcheon 210 during the process of changing the handing configuration of the trim 200. This is in contrast to certain existing approaches, in which a backplate must be removed from the escutcheon in order to change the handing configuration of the trim.

As should be appreciated from the foregoing, the cam 250 is operable to cause the indicator plate 240 to move between its first position and its second position both when the cam 250 is in the first handing orientation and when the cam 250 is in the second handing orientation. When the cam 250 is in the first handing orientation (FIGS. 3 and 4), the cam 250 is rotatable between a first unlocking position (FIG. 3) and a first locking position (FIG. 4), and is configured to interface with the indicator plate 240 via the first cam interface portion 272 to drive the indicator plate 240 between its unlock-indicating position and its lock-indicating position as the cam 250 rotates between its first unlocking position and its first locking position. Similarly, when the cam 250 is in the second handing orientation (FIGS. 6 and 7), the cam 250 is rotatable between a second unlocking position (FIG. 6) and a second locking position (FIG. 7), and is configured to interface with the indicator plate 240 via the second cam interface portion 272' to drive the indicator plate 240 between its unlock-indicating position and its lock-indicating position as the cam 250 rotates between its second unlocking position and its second locking position.

In the illustrated embodiment, the trim 200 includes one or more tamper-resistant features configured to inhibit users from tampering with the trim 200 in a manner that would affect operation of the mortise chassis 100. As one example, the primary window 214 and/or the secondary windows 214' may be provided with a non-opaque (e.g., transparent or translucent) pane that inhibits users from adjusting the position of the indicator plate 240. It is also contemplated that additional or alternative features of the trim 200 may discourage tampering.

It may be the case that a user attempts to tamper with the trim 200 while the trim 200 is in the locked state illustrated in FIG. 4. Such tampering may come in the form of an upward force exerted against the indicator plate 240 in an attempt to move the indicator plate 240 toward its unlock-indicating position. In such an event, however, the surface 276 may engage the post 255 such that the resulting force is substantially normal to the rotational axis of the cam 250, thereby preventing the creation of a moment that would urge the cam 250 toward its unlocked position. With the cam 250 retained in this position, the lockset remains in its first locked/unlocked state (e.g., its locked state), and the indicator plate 240 remains in the appropriate position (e.g., its lock-indicating position). Those skilled in the art will readily recognize that a similar engagement of the surface 276' with the post 255 may occur when the trim 200 is in the second locked state illustrated in FIG. 7.

It may be the case that a user attempts to tamper with the trim 200 while the trim 200 is in the first unlocked state illustrated in FIG. 3. Such tampering may come in the form of a downward force exerted against the indicator plate 240 in an attempt to move the indicator plate 240 toward its lock-indicating position. In such a case, the surface 274 may engage the post 255 such that the resulting force is substantially normal to the rotational axis of the cam 250, thereby preventing the creation of a moment that would urge the cam 250 toward its locked position. Those skilled in the art will readily recognize that a similar engagement of the surface 274' with the post 255 may occur when the trim 200 is in the second unlocked state illustrated in FIG. 6.

Figure 8:
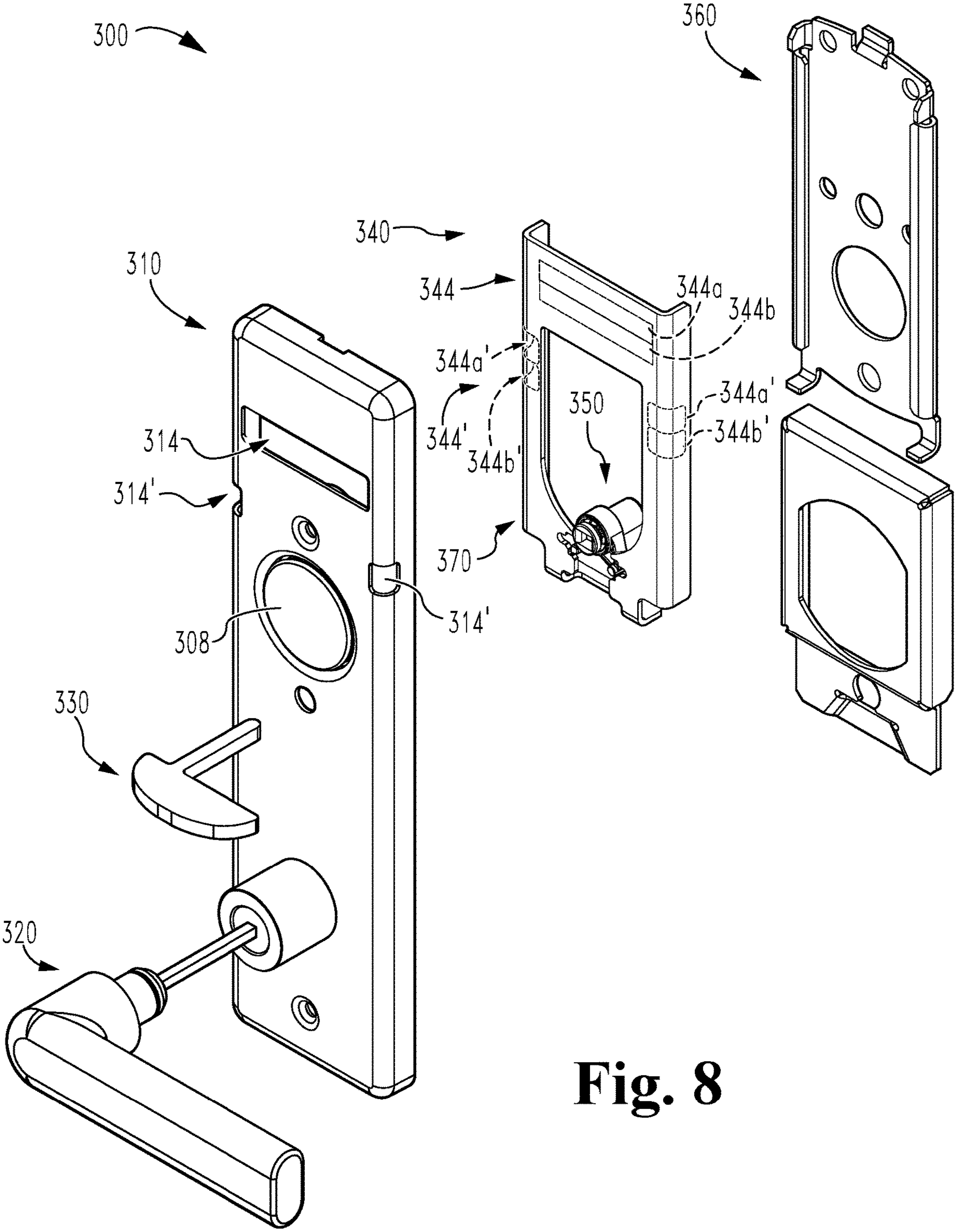
FIG. 8 is an exploded assembly view of a non-handed trim according to certain embodiments.

With additional reference to FIG. 8, illustrated therein is a non-handed trim 300 according to certain embodiments. The trim 300 may, for example, be utilized in connection with the mortise chassis 100 illustrated in FIG. 1. The trim 300 is somewhat similar to the trim 200 illustrated in FIGS. 2-7, and generally includes an escutcheon 310, a handle 320, a turnpiece 330, an indicator plate 340, a cam 350, a backplate 360, and a cam interface 370, which respectively correspond to the above-described escutcheon 210, handle 220, turnpiece 230, indicator plate 240, cam 250, backplate 260, and cam interface 270. In the interests of conciseness, the following description of the trim 300 focuses primarily on elements and features that differ from those described above with reference to the trim 200.

In certain embodiments, the trim 300 may further include a cylinder 308 that extends beyond the rear plane of the escutcheon 310 and is operable to extend into the circular portion 192 of the mounting location 190. In the illustrated form, the cylinder 308 is a dummy cylinder that may, for example, be provided along the lines described below with reference to the trim 600 illustrated in FIGS. 20 and 21. It is also contemplated that the cylinder 308 may be an active lock cylinder operable to rotate the turnhub 160 when actuated by an appropriate key.

Figure 9:
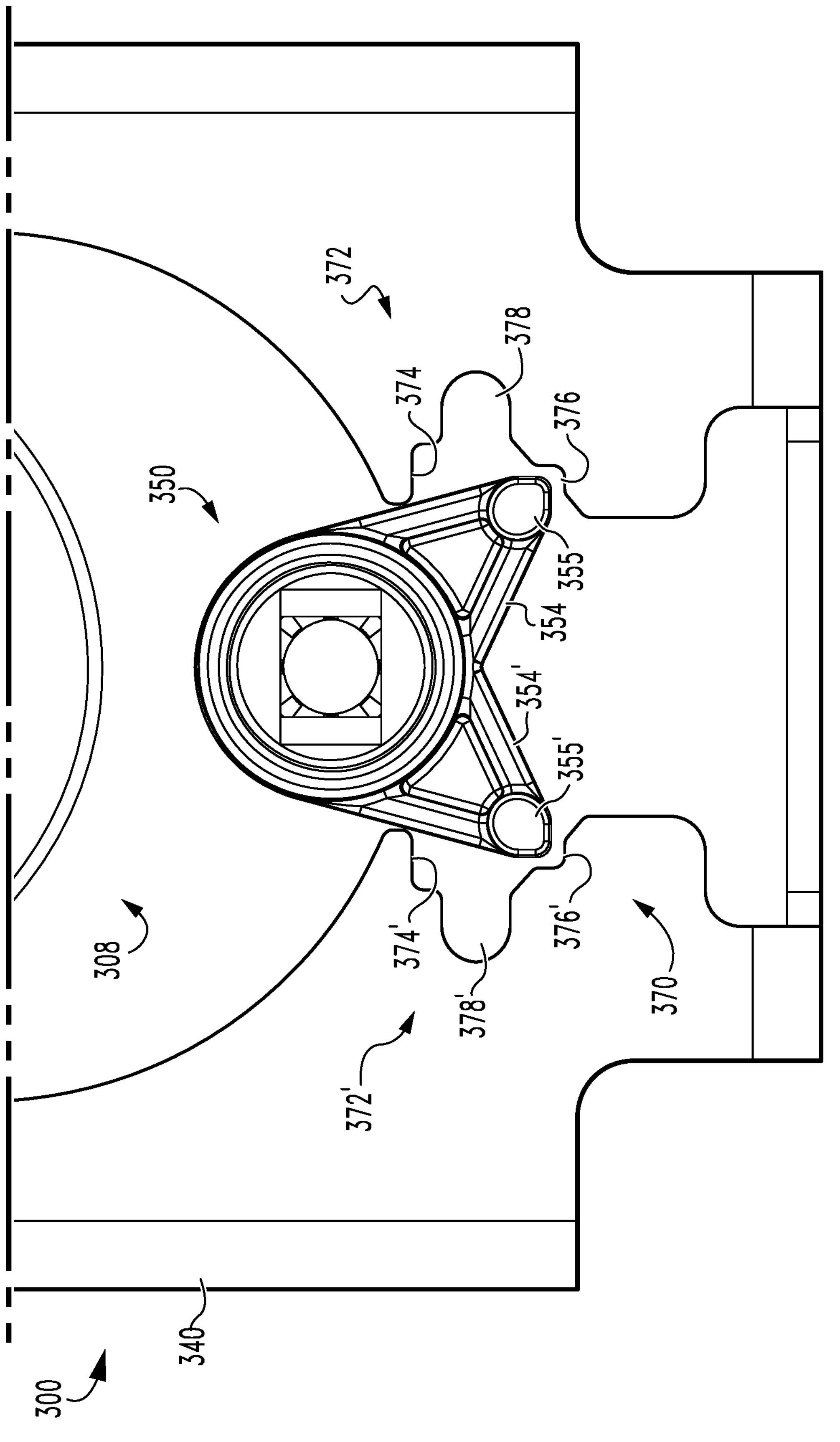
FIG. 9 is a plan view of a portion of the non-handed trim illustrated in FIG. 8, with a cam in a neutral position.

With additional reference to FIG. 9, certain differences between the previously-described trim 200 and the trim 300 relate to the cam 350 and the cam interface 370. In contrast to the trim 200, in which the cam 250, backplate 260, and cam interface 270 facilitate the selection and adjustment of the handing configuration for the trim 200, the cam 350 and the cam interface 370 provide the trim 300 with a non-handed configuration that does not require handing selection. As described herein, the trim 300 is thereby operable to provide visual indications regarding the locked/unlocked status of the mortise chassis 100 regardless of the handing of the mortise chassis 100 and without adjustment of the trim 300.

The cam 350 includes a pair of arms 354, 354', each of which includes a corresponding post 355, 355', and the cam interface 370 includes a pair of cam interface portions 372, 372', each of which is operable to interface with a corresponding one of the posts 355, 355'. More particularly, the cam 350 includes a first arm 354 including a first post 355 operable to interface with the first cam interface portion 372 when the mortise chassis 100 is provided in a first handing configuration, and a second arm 354' including a second post 355' operable to interface with the second cam interface portion 372' when the mortise chassis 100 is provided in a second handing configuration.

The first cam interface portion 372 generally includes an upper ledge 374, a lower ledge 376, and a notch 378 positioned between the ledges 374, 376. In the illustrated form, the second cam interface portion 372' is a mirror image of the first cam interface portion 372, and generally includes an upper ledge 374', a lower ledge 376', and a notch 378' positioned between the ledges 374', 376'. When the cam 350 is in a neutral position (FIG. 9), the indicator plate 340 is in its first indicating position, in which the first indicia 344*a* of indicia 344, and the first indicia 344*a'* of indicia 344', are aligned with the windows 314, 314', respectively. As described herein, rotation of the cam 350 in either direction from this neutral position causes the cam 350 to drive the indicator plate 340 upward to its second indicating position, in which the second indicia 344*b* of indicia 344, and the second indicia 344*b'* of indicia 344', are aligned with the windows 314, 314', respectively.

In the illustrated embodiment, the upper first indicia 344*a*, 344*a'* are lock indicia such that the lower position of the indicator plate 340 is the lock-indicating position, and the lower second indicia 344*b*, 344*b'* are unlock indicia such that the upper position of the indicator plate 340 is the unlock-indicating position. It is also contemplated that this configuration may be reversed such that the lower position of the indicator plate 340 is the unlock-indicating position and the upper position of the indicator plate 340 is the lock-indicating position.

Figure 10:
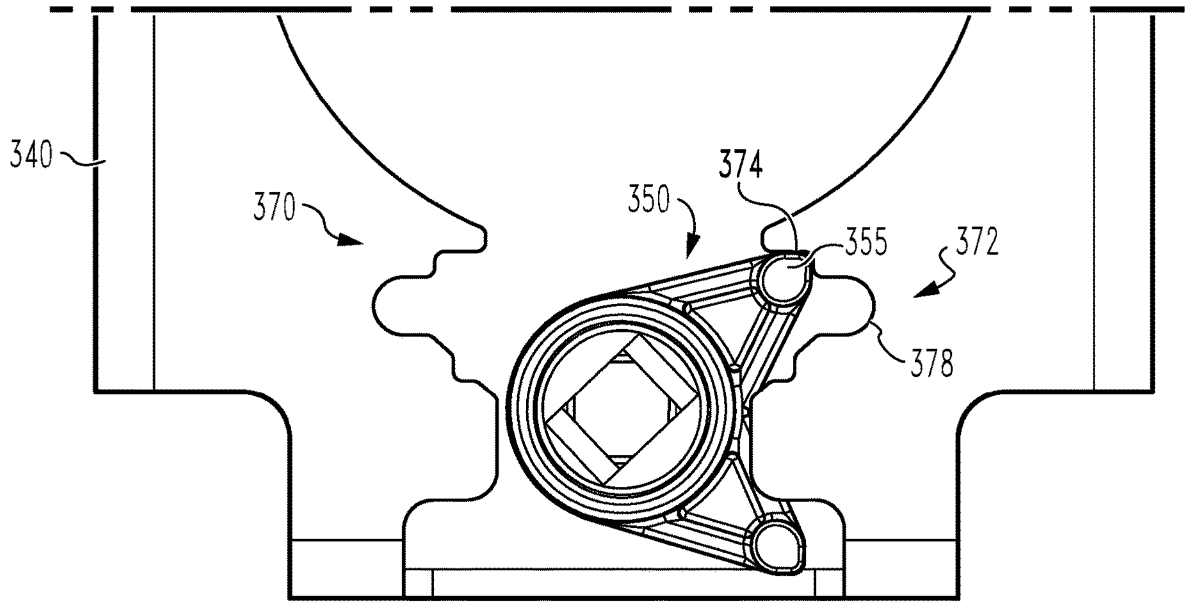
FIG. 10 is a plan view of a portion of the non-handed trim illustrated in FIG. 8, with the cam in a first rotated position.
Figure 11:
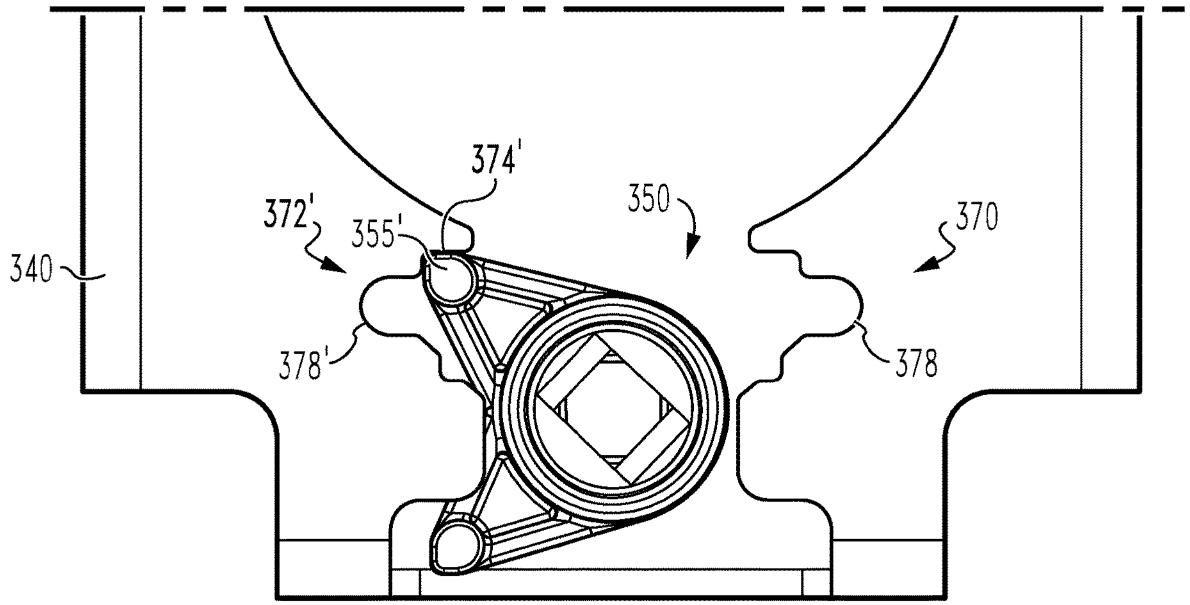
FIG. 11 is a plan view of a portion of the non-handed trim illustrated in FIG. 8, with the cam in a second rotated position.

With additional reference to FIGS. 10 and 11, illustrated therein is a portion of the trim 300 while installed to the mortise chassis 100 with the mortise chassis 100 in a first handing configuration (FIG. 10) and a second handing configuration (FIG. 11). More particularly, each of FIGS. 10 and 11 illustrate the portion of the trim 300 after the cam 350 has been rotated from its neutral position in an actuating direction corresponding to the handing of the mortise chassis 100 to thereby drive the indicator plate 340 to its second indicating position.

When the mortise chassis 100 is provided and/or installed in its first handing configuration, the unlocking direction for the turnpiece 330, the cam 350, and the turnhub 160 is a first unlocking direction (counter-clockwise in FIGS. 9 and 10). In this configuration, rotation of the cam 350 in the first unlocking direction causes the first post 355 to drive the indicator plate 340 upward to its second indicating position against a bias force (e.g., spring force or gravity) that urges the indicator plate 340 downward to its first indicating position. Thus, rotation of the cam 350 from its neutral locking position (FIG. 9) to its first unlocking position (FIG. 10) causes the first post 355 to interface with the first cam interface portion 372 to drive the indicator plate 340 from its lock-indicating position to its unlock-indicating position.

When the mortise chassis 100 is provided and/or installed in its second handing configuration, the unlocking direction for the turnpiece 330, the cam 350, and the turnhub 160 is a second unlocking direction (clockwise in FIGS. 9 and 11). In this configuration, rotation of the cam 350 in the second unlocking direction causes the second post 355' to drive the indicator plate 340 upward to its second indicating position against a bias force (e.g., spring force or gravity) that urges the indicator plate 340 downward to its first indicating position. Thus, rotation of the cam 350 from its neutral locking position (FIG. 9) to its second unlocking position (FIG. 11) causes the second post 355' to interface with the second cam interface portion 372' to drive the indicator plate 340 from its lock-indicating position to its unlock-indicating position.

In the illustrated embodiment, the trim 300 includes one or more tamper-resistant features configured to inhibit users from tampering with the trim 300 in a manner that would affect operation of the mortise chassis 100. As one example, the primary window 314 and/or the secondary windows 314' may be provided with a non-opaque (e.g., transparent or translucent) pane that inhibits users from adjusting the position of the indicator plate 340. It is also contemplated that additional or alternative features of the trim 300 may discourage tampering.

It may be the case that a user attempts to tamper with the trim 300 while the trim 300 is in the locked state illustrated in FIG. 9. Such tampering may come in the form of an upward force exerted against the indicator plate 340 in an attempt to move the indicator plate 340 toward its unlock-indicating position. In such an event, however, one or both of the ledges 376, 376' may engage the corresponding post 355, 355' to thereby retain the cam 350 in its neutral locking position. With the cam 350 retained in its neutral position, the lockset remains in its first locked/unlocked state (e.g., its locked state), and the indicator plate 340 remains in the appropriate position (e.g., its lock-indicating position).

It may be the case that a user attempts to tamper with the trim 300 while the trim 300 is in the first unlocked state illustrated in FIG. 10 or the second unlocked state illustrated in FIG. 11. Such tampering may come in the form of a downward force exerted against the indicator plate 340 in an attempt to move the indicator plate 340 toward its lock-indicating position. In such a case, the surface 374 and the adjacent surface may exert on the pin 355 torques in opposite directions to thereby ensure that the cam 350 remains in its unlocking position.

Figure 12:
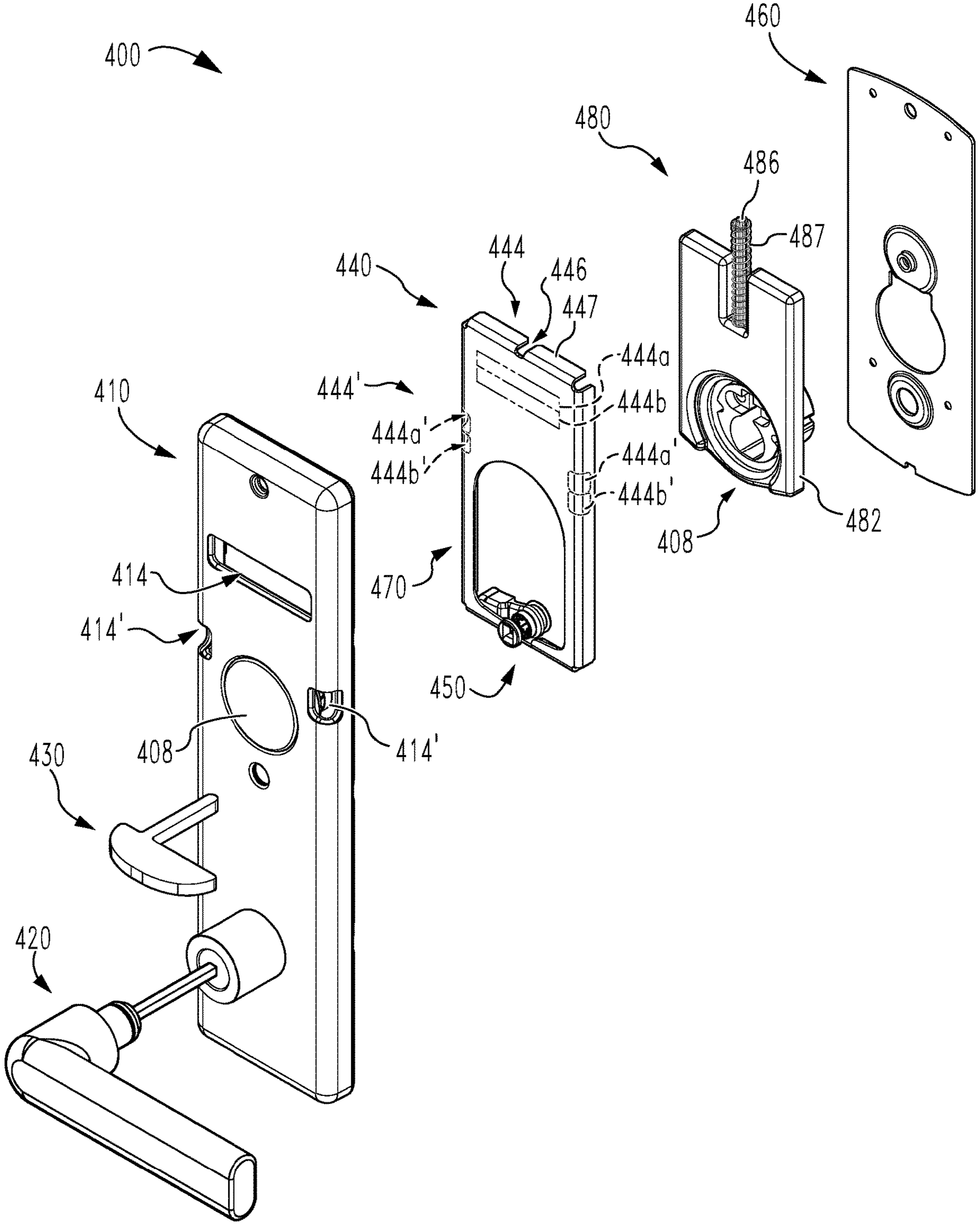
FIG. 12 is an exploded assembly view of a non-handed trim according to certain embodiments.

With additional reference to FIG. 12, illustrated therein is a non-handed trim 400 according to certain embodiments. The trim 400 may, for example, be utilized in connection with the mortise chassis 100 illustrated in FIG. 1. The trim 400 is somewhat similar to the trim 200 illustrated in FIGS. 2-7 and the trim 300 illustrated in FIGS. 8-11, and generally includes an escutcheon 410, a handle 420, a turnpiece 430, an indicator plate 440, a cam 450, a backplate 460, and a cam interface 470, which respectively correspond to the above-described escutcheons 210, 310, handles 220, 320, turnpieces 230, 330, indicator plates 240, 340, cams 250, 350, backplates 260, 360, and cam interfaces 270, 370. In the interests of conciseness, the following description of the trim 400 focuses primarily on elements and features that differ from those described above with reference to the trim 200 and/or the trim 300.

In certain embodiments, the trim 400 may further include a cylinder 408 that extends beyond the rear plane of the escutcheon 410 and is operable to extend into the circular portion 192 of the mounting location 190. In the illustrated form, the cylinder 408 is a dummy cylinder that may, for example, be provided along the lines described below with reference to the trim 600 illustrated in FIGS. 20 and 21. It is also contemplated that the cylinder 408 may be an active lock cylinder operable to rotate the turnhub 160 when actuated by an appropriate key.

In the illustrated form, the trim 400 further includes a bias mechanism 480 biasing the indicator plate 440 upward toward its second indicating position, in which the lower second indicia 444*b*, 444*b'* are aligned with the windows 414, 414'. The bias mechanism 480 generally includes a baseplate 482 that is coupled with the escutcheon 410 and/or the backplate 460. The baseplate 482 includes a post 486 that extends through an opening 446 in a flange 447 of the indicator plate. The bias mechanism 480 further includes a bias member in the form of a spring 487 that is mounted to the post 486 and engages with the flange 447 to thereby bias the indicator plate 440 upward toward its second indicating position. While the illustrated bias member is provided in the form of a coiled compression spring 487, it is also contemplated that the indicator plate 440 may be biased toward its second indicating position by another form of bias member, such as one including an extension spring, a torsion spring, a leaf spring, and/or magnets.

In the illustrated embodiment, the upper first indicia 444*a*, 444*a*' are unlock indicia such that the lower first position of the indicator plate 440 is the unlock-indicating position, and the lower second indicia 444*b*, 444*b*' are lock indicia such that the upper second position of the indicator plate 440 is the lock-indicating position. It is also contemplated that this configuration may be reversed such that the lower position of the indicator plate 440 is the lock-indicating position and the upper position of the indicator plate 440 is the unlock-indicating position.

Figure 13:
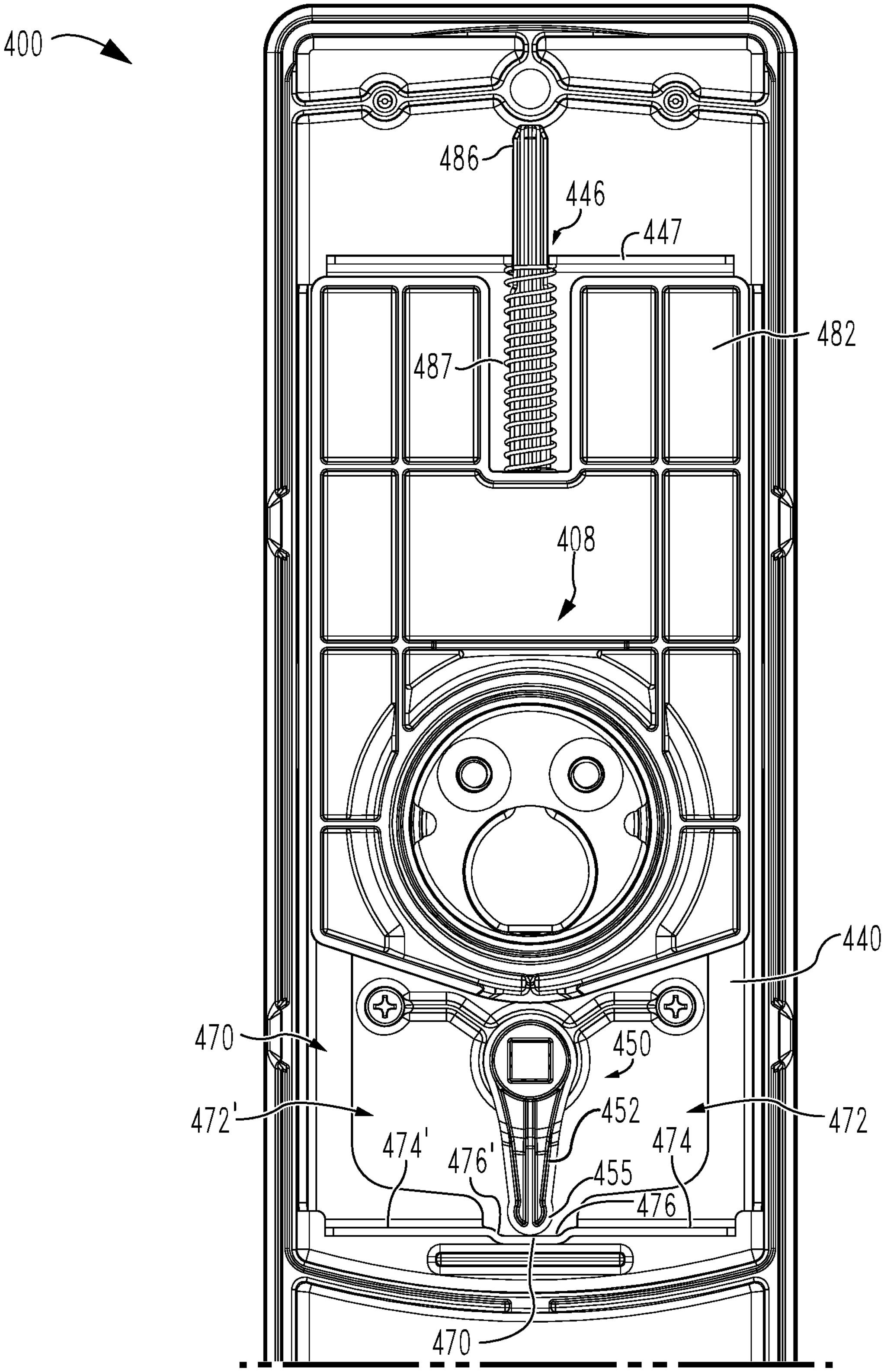
FIG. 13 is a rear view of the non-handed trim illustrated in FIG. 12, with a cam in a neutral position.

With additional reference to FIG. 13, the cam 450 is substantially similar to the above-described cam 250, and generally includes an arm 454 and a post 455 formed at or near an end of the arm 454. The cam interface 470 includes a first cam interface portion 472 and a second cam interface portion 472', each of which is operable to engage the cam 450. The first cam interface portion 472 generally includes a first landing 474 and a second ramp 476 formed on a central landing 479 of the cam profile 470. The second cam interface portion 472' is generally a mirror image of the first cam interface portion 472, and generally includes a second landing 474' and a second ramp 476' formed on the central landing 479.

FIG. 13 illustrates a portion of the trim 400 with the cam 450 in a neutral or home position corresponding to a first locked/unlocked state of the mortise chassis 100 (e.g., the unlocked state). In this state, the post 455 is engaged with the central landing 479 and retains the indicator plate 440 in its lower or first indicating position against the bias force of the spring 487, which is engaged with the flange 447 and biases the indicator plate 440 upward toward its second indicating position. As a result of the indicator plate 440 being held in its lower first indicating position, the upper first indicia 444*a*, 444*a*' (e.g., the unlock indicia) are aligned with the windows 414, 414', thereby indicating that the lockset is in its first (e.g., unlocked) state.

Figure 15:
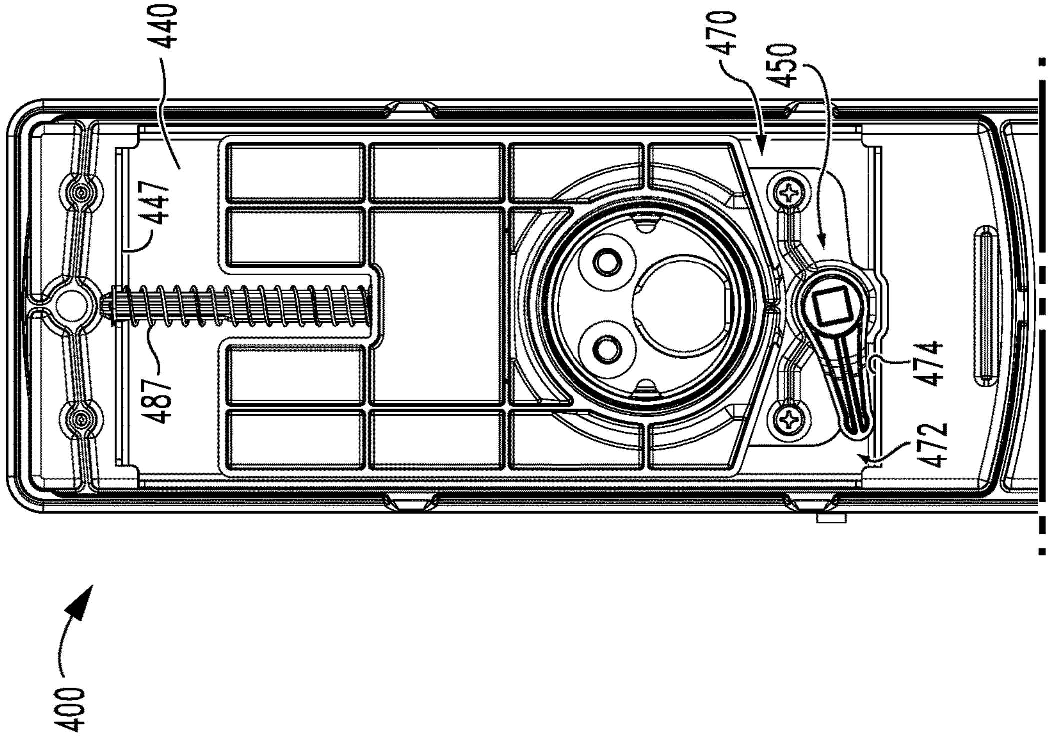
FIG. 15 is a rear view of the non-handed trim illustrated in FIG. 12, with the cam in a second rotated position.
Figure 14:
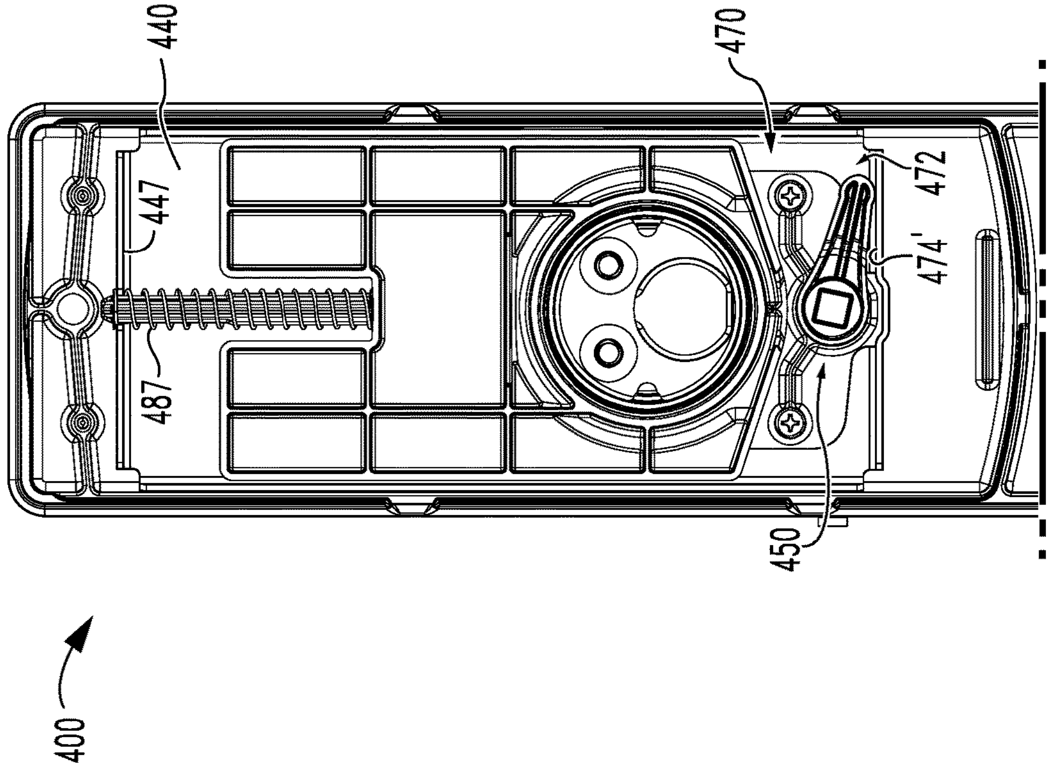
FIG. 14 is a rear view of the non-handed trim illustrated in FIG. 12, with the cam in a first rotated position.

With additional reference to FIGS. 14 and 15, illustrated therein is a portion of the trim 400 while installed to the mortise chassis 100 with the mortise chassis 100 in a first handing configuration (FIG. 14) and a second handing configuration (FIG. 15). More particularly, each of FIGS. 14 and 15 illustrate the portion of the trim 400 after the cam 450 has been rotated from its neutral position in a locking direction corresponding to the handing of the mortise chassis 100 to thereby drive the indicator plate 440 to its second indicating position.

When the mortise chassis 100 is provided and/or installed in its first handing configuration, the locking direction for the turnpiece 430, the cam 450, and the turnhub 160 may be a first locking direction (counter-clockwise in FIGS. 13 and 14). In this configuration, rotation of the cam 450 in the first locking direction causes the post 455 to disengage from the central landing 479 such that the spring 487 drives the indicator plate 440 upward toward its second indicating position. When the cam 450 is subsequently rotated in its first unlocking direction (clockwise in FIGS. 13 and 14), the post 455 interfaces with the first landing 474 to drive the indicator plate 440 downward against the force of the spring 487, thereby returning the indicator plate 440 to its first indicating position (e.g., its unlock-indicating position) as the lockset returns to its first locked/unlocked state (e.g., its unlocked state). Thus, with the lockset in the first handing configuration, rotation of the cam 450 between its neutral unlocking position (FIG. 13) and its first locking position (FIG. 14) causes the post 455 of the cam 450 to interface with the first cam interface portion 472 to thereby cause movement of the indicator plate 440 between its first indicating position (e.g., its unlock-indicating position) and its second indicating position (e.g., its lock-indicating position).

When the mortise chassis 100 is provided and/or installed in its second handing configuration, the locking direction for the turnpiece 430, the cam 450, and the turnhub 160 may be a second locking direction (clockwise in FIGS. 13 and 15). In this configuration, rotation of the cam 450 in the second locking direction causes the post 455 to disengage from the central landing 479 such that the spring 487 drives the indicator plate 440 upward toward its second indicating position. When the cam 450 is subsequently rotated in its second unlocking direction (counter-clockwise in FIGS. 13 and 14), the post 455 interfaces with the second landing 474' to drive the indicator plate 440 downward against the force of the spring 487, thereby returning the indicator plate 440 to its first indicating position (e.g., its unlock-indicating position) as the lockset returns to its first locked/unlocked state (e.g., its unlocked state). Thus, with the lockset in the second handing configuration, rotation of the cam 450 between its neutral unlocking position (FIG. 13) and its second locking position (FIG. 15) causes the post 455 of the cam 450 to interface with the second cam interface portion 472' to thereby cause movement of the indicator plate 440 between its first indicating position (e.g., its unlock-indicating position) and its second indicating position (e.g., its lock-indicating position).

In the illustrated embodiment, the trim 400 includes one or more tamper-resistant features configured to inhibit users from tampering with the trim 400 in a manner that would affect operation of the mortise chassis 100. As one example, the primary window 414 and/or the secondary windows 414' may be provided with a non-opaque (e.g., transparent or translucent) pane that inhibits users from adjusting the position of the indicator plate 440. It is also contemplated that additional or alternative features of the trim 400 may discourage tampering.

It may be the case that a user attempts to tamper with the trim 400 while the trim 400 is in the unlocked state illustrated in FIG. 13. Such tampering may come in the form of an upward force exerted against the indicator plate 440 in an attempt to move the indicator plate 440 toward its lock-indicating position. In such an event, however, one of the ramps 476, 476' may engage the post 455 to thereby retain the cam 450 in its neutral position. With the cam 450 retained in its neutral position, the lockset remains in its first locked/unlocked state (e.g., its unlocked state), and the indicator plate 440 remains in its first indicating position (e.g., its unlock-indicating position).

It may be the case that a user attempts to tamper with the trim 400 while the trim 400 is in the first locked state illustrated in FIG. 14 or the second locked state illustrated in FIG. 15. Such tampering may come in the form of a downward force exerted against the indicator plate 440 in an attempt to move the indicator plate 440 toward its unlock-indicating position. While such a tampering force may initially move the indicator plate 440 toward its unlock-indicating position, the spring 487 will return the indicator plate 440 to its lock-indicating position when such a tampering force is removed, thereby returning the trim 400 to the appropriate state.

Figure 16:
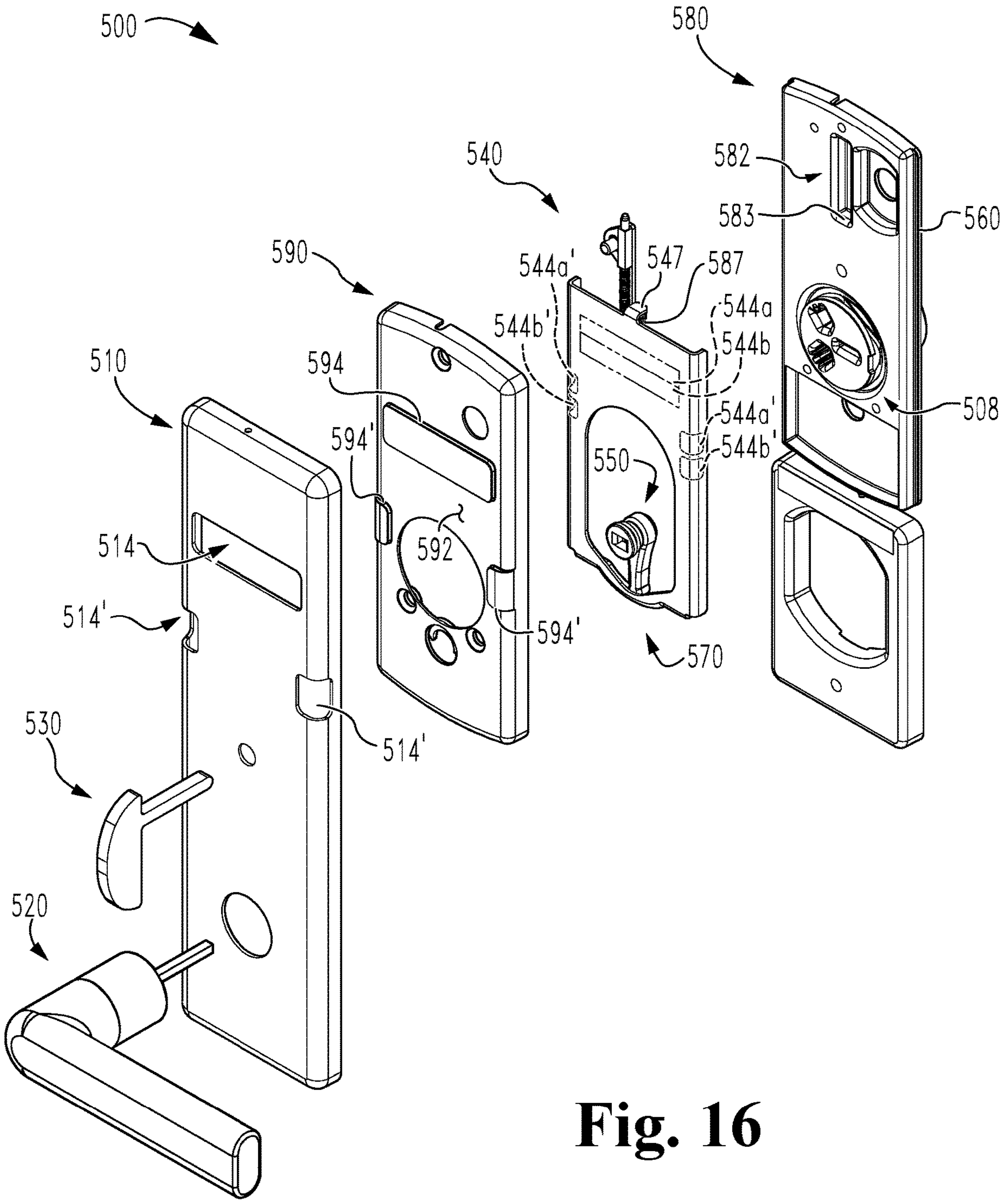
FIG. 16 is an exploded assembly view of a non-handed trim according to certain embodiments.

With additional reference to FIG. 16, illustrated therein is a non-handed trim 500 according to certain embodiments. The trim 500 may, for example, be utilized in connection with the mortise chassis 100 illustrated in FIG. 1. The trim 500 is somewhat similar to the trim 200 illustrated in FIGS. 2-7, the trim 300 illustrated in FIGS. 8-11, and the trim 400 illustrated in FIGS. 12-15, and similar reference characters are used to indicate similar elements and features. For example, the trim 500 and generally includes an escutcheon 510, a handle 520, a turnpiece 530, an indicator plate 540, a cam 550, a backplate 560, and a cam interface 570, which respectively correspond to the above-described escutcheons 210, 310, 410, handles 220, 320, 420, turnpieces 230, 330, 430, indicator plates 240, 340, 440, cams 250, 350, 450, backplates 260, 360, 460, and cam interfaces 270, 370, 470. The trim 500 also includes a bias mechanism 580 that corresponds to the bias mechanism 480, and which biases the indicator plate 540 upward toward its second indicating position. In the interests of conciseness, the following description of the trim 500 focuses primarily on elements and features that differ from those described above with reference to the trim 200, the trim 300, and/or the trim 400.

In certain embodiments, the trim 500 may further include a cylinder 508 that extends beyond the rear plane of the escutcheon 510 and is operable to extend into the circular portion 192 of the mounting location 190. In the illustrated form, the cylinder 508 is a dummy cylinder that may, for example, be provided along the lines described below with reference to the trim 600 illustrated in FIGS. 20 and 21. It is also contemplated that the cylinder 508 may be an active lock cylinder operable to rotate the turnhub 160 when actuated by an appropriate key.

The illustrated trim 500 further includes a cover plate 590 that is mounted in the escutcheon 510 in front of the indicator plate 540. The cover plate 590 is transparent or translucent, and includes a primary pane 594 and a pair of secondary panes 594'. The primary pane 594 aligns with the primary window 514, and each of the secondary panes 594' aligns with a corresponding one of the secondary windows 514'. In the illustrated form, the panes 594, 594' are elevated beyond the main surface 592 of the cover plate 590 such that the panes 594, 594' project into the windows 514, 514'. For example, the front sides of the panes 594, 594' may be flush with the front surface 519 of the escutcheon 510. It is also contemplated that the panes 594, 594' may not necessarily be elevated beyond the main surface 592. As will be appreciated, the cover plate 590 may aid in discouraging users from tampering with the indicator plate 540. While not specifically illustrated in the previously-discussed embodiments, it should be appreciated that a cover plate along the lines of the cover plate 590 may be utilized in connection with the trim 200, the trim 300, and/or the trim 400.

The bias mechanism 580 of the illustrated embodiment generally includes a pocket 582 formed in the backplate 560 and a bias member such as a compression spring 587 seated in the pocket 582. The spring 587 is captured between a flange 547 of the indicator plate 540 and a floor 583 of the pocket 582, and thereby biases the indicator plate 540 toward its second (e.g., upper) position.

In the illustrated embodiment, the upper first indicia 544*a*, 544*a'* are unlock indicia such that the lower first position of the indicator plate 540 is the unlock-indicating position, and the lower second indicia 544*b*, 544*b'* are lock indicia such that the upper second position of the indicator plate 540 is the lock-indicating position. It is also contemplated that this configuration may be reversed such that the lower position of the indicator plate 540 is the lock-indicating position and the upper position of the indicator plate 540 is the unlock-indicating position.

Figure 17:
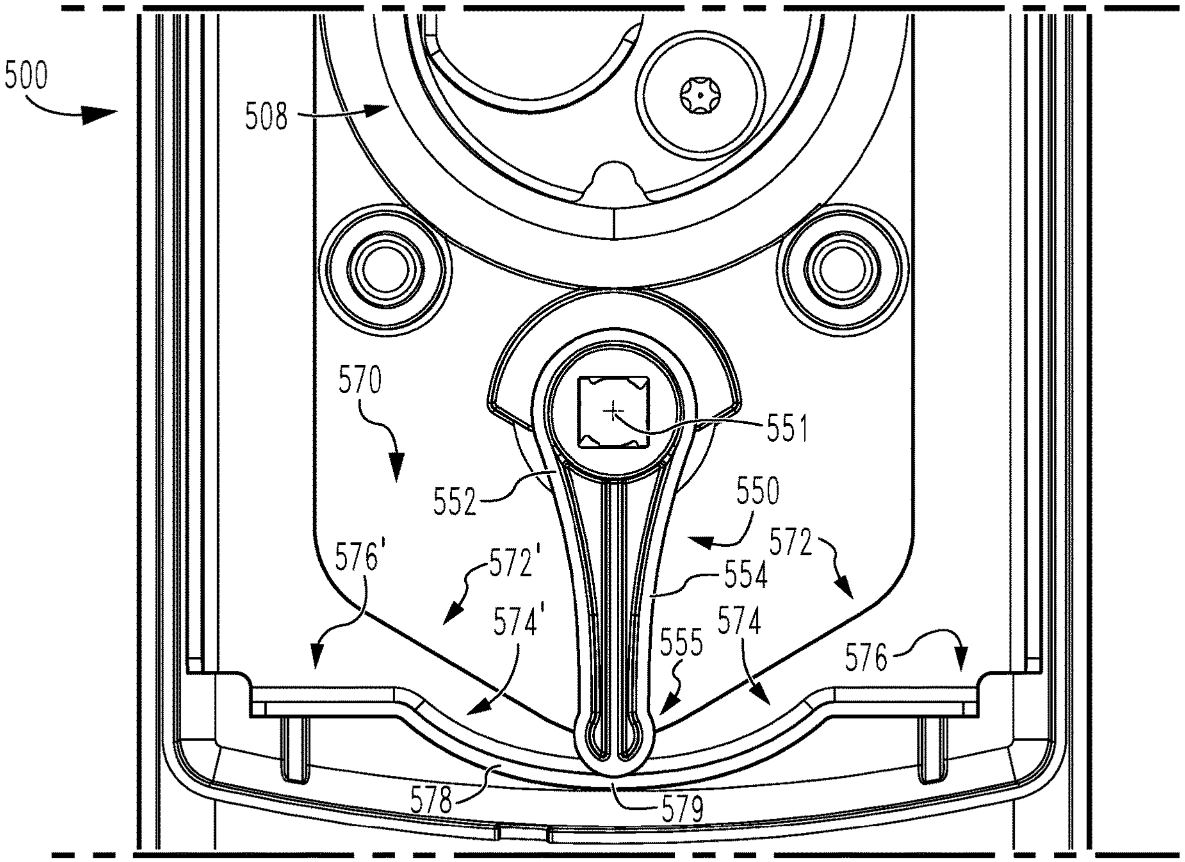
FIG. 17 is a rear view of the non-handed trim illustrated in FIG. 16, with a cam in a neutral position.

With additional reference to FIG. 17, the cam 550 is substantially similar to the above-described cam 550, is mounted for rotation about a rotational axis 551, and includes a body portion 552 and an arm 554 that extends from the body portion 552 and includes a post 555. The cam interface 570 includes a first cam interface portion 572 and a second cam interface portion 572'. The first cam interface portion 572 is operable to interface with the cam 550, and generally includes a first arcuate wall segment 574 and a first ledge 576. The second cam interface portion 572' is generally a mirror image of the first cam interface portion 572, is operable to interface with the cam 550, and generally includes a second arcuate wall segment 574' and a second ledge 576'. The first arcuate wall segment 574 and the second arcuate wall segment 574' together define an arcuate wall 578 having a nadir 579 below the rotational axis 551.

FIG. 17 illustrates a portion of the trim 500 with the cam 550 in a neutral or home position corresponding to a first locked/unlocked state of the mortise chassis 100 (e.g., the unlocked state). In this state, the post 555 is engaged with the arcuate wall 578 at or near the nadir 579, and retains the indicator plate 540 in its lower or first indicating position against the bias force of the spring 587, which is engaged with the flange 547 and biases the indicator plate 540 upward toward its second indicating position. As a result of the indicator plate 540 being held in its lower first indicating position, the upper first indicia 544*a*, 544*a'* (e.g., the unlock indicia) are aligned with the windows 514, 514', thereby indicating that the lockset is in its first (e.g., unlocked) state.

Figure 18:
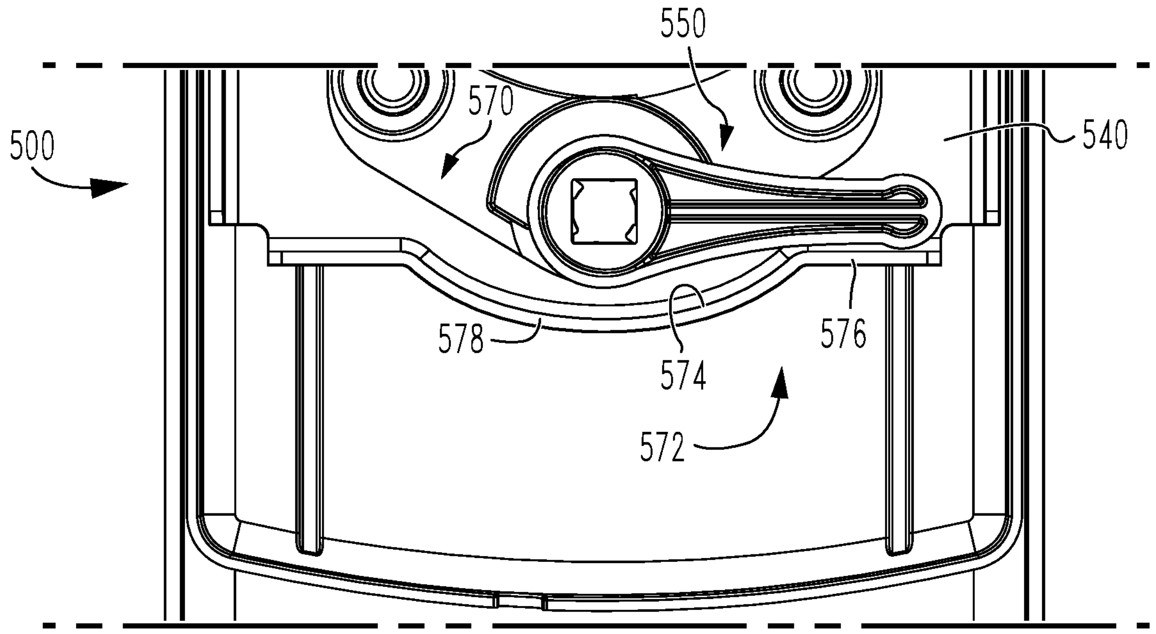
FIG. 18 is a rear view of the non-handed trim illustrated in FIG. 16, with the cam in a second rotated position.
Figure 19:
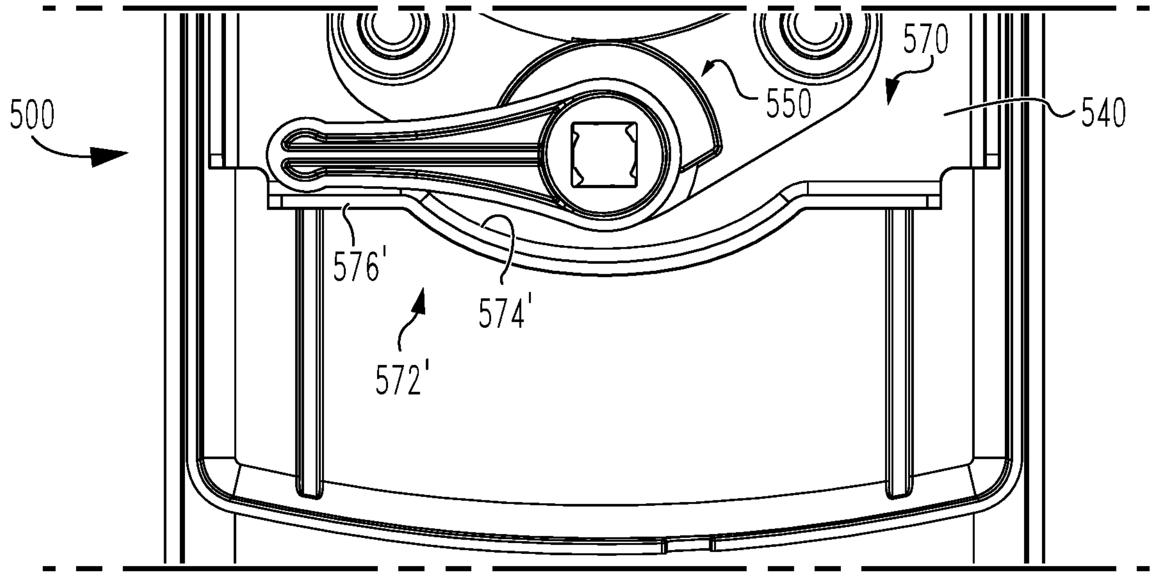
FIG. 19 is a rear view of the non-handed trim illustrated in FIG. 16, with the cam in a second rotated position.

With additional reference to FIGS. 18 and 19, illustrated therein is a portion of the trim 500 while installed to the mortise chassis 100 with the mortise chassis 100 in a first handing configuration (FIG. 18) and a second handing configuration (FIG. 19). More particularly, each of FIGS. 18 and 19 illustrate the portion of the trim 500 after the cam 550 has been rotated from its neutral position in a locking direction corresponding to the handing of the mortise chassis 100 to thereby drive the indicator plate 540 to its second indicating position, which in the illustrated form is the lock-indicating position.

When the mortise chassis 100 is provided and/or installed in its first handing configuration, the locking direction for the turnpiece 530, the cam 550, and the turnhub 160 may be a first locking direction (counter-clockwise in FIGS. 17 and 18). In this configuration, rotation of the cam 550 in the first locking direction causes the post 555 to disengage from the arcuate wall 578 such that the spring 587 drives the indicator plate 540 upward toward its second indicating position. When the cam 550 is subsequently rotated in its first unlocking direction (clockwise in FIGS. 17 and 18), the post 555 interfaces with the first landing 574 to drive the indicator plate 540 downward against the force of the spring 587, thereby returning the indicator plate 540 to its first indicating position (e.g., its unlock-indicating position) as the lockset returns to its first locked/unlocked state (e.g., its unlocked state). Thus, with the lockset in the first handing configuration, rotation of the cam 550 between its neutral unlocking position (FIG. 17) and its first locking position (FIG. 18) causes the post 555 of the cam 550 to interface with the first cam interface portion 572 to thereby cause movement of the indicator plate 540 between its first indicating position (e.g., its unlock-indicating position) and its second indicating position (e.g., its lock-indicating position).

When the mortise chassis 100 is provided and/or installed in its second handing configuration, the locking direction for the turnpiece 530, the cam 550, and the turnhub 160 may be a second locking direction (clockwise in FIGS. 17 and 19). In this configuration, rotation of the cam 550 in the second locking direction causes the post 555 to disengage from the arcuate wall 578 such that the spring 587 drives the indicator plate 540 upward toward its second indicating position. When the cam 550 is subsequently rotated in its second unlocking direction (counter-clockwise in FIGS. 13 and 14), the post 555 interfaces with the second landing 574' to drive the indicator plate 540 downward against the force of the spring 587, thereby returning the indicator plate 540 to its first indicating position (e.g., its unlock-indicating position) as the lockset returns to its first locked/unlocked state (e.g., its unlocked state). Thus, with the lockset in the second handing configuration, rotation of the cam 550 between its neutral unlocking position (FIG. 17) and its second locking position (FIG. 19) causes the post 555 of the cam 550 to interface with the second cam interface portion 572' to cause movement of the indicator plate 540 between its first indicating position (e.g., its unlock-indicating position) and its second indicating position (e.g., its lock-indicating position).

In the illustrated embodiment, the trim 500 includes one or more tamper-resistant features configured to inhibit users from tampering with the trim 500 in a manner that would affect operation of the mortise chassis 100. As one example, the cover plate 590 inhibits users from adjusting the position of the indicator plate 540. It is also contemplated that additional or alternative features of the trim 500 may discourage tampering.

It may be the case that a user attempts to tamper with the trim 500 while the trim 500 is in the unlocked state illustrated in FIG. 17. Such tampering may come in the form of an upward force exerted against the indicator plate 540 in an attempt to move the indicator plate 540 toward its lock-indicating position. In such an event, however, the arcuate surface 578 engages with the cam 550 to inhibit motion of the indicator plate 540 and the cam 550. As noted above, the arcuate surface 578 may be arcuate about the rotational axis 551 of the cam 550. In such forms, the upward tampering force on the indicator plate may be transmitted to the cam 550 along a vector that intersects the rotational axis 551, thereby resulting in little to no torque being exerted on the cam 550. With the cam 550 retained in its neutral position, the lockset remains in its first locked/unlocked state (e.g., its unlocked state), and the indicator plate 540 remains in its first indicating position (e.g., its unlock-indicating position).

It may be the case that a user attempts to tamper with the trim 500 while the trim 500 is in the first locked state illustrated in FIG. 18 or the second locked state illustrated in FIG. 19. Such tampering may come in the form of a downward force exerted against the indicator plate 540 in an attempt to move the indicator plate 540 toward its unlock-indicating position. While such a tampering force may initially move the indicator plate 540 toward its unlock-indicating position, the spring 587 will return the indicator plate 540 to its lock-indicating position when such a tampering force is removed, thereby returning the trim 500 to the appropriate state.

Figure 20:
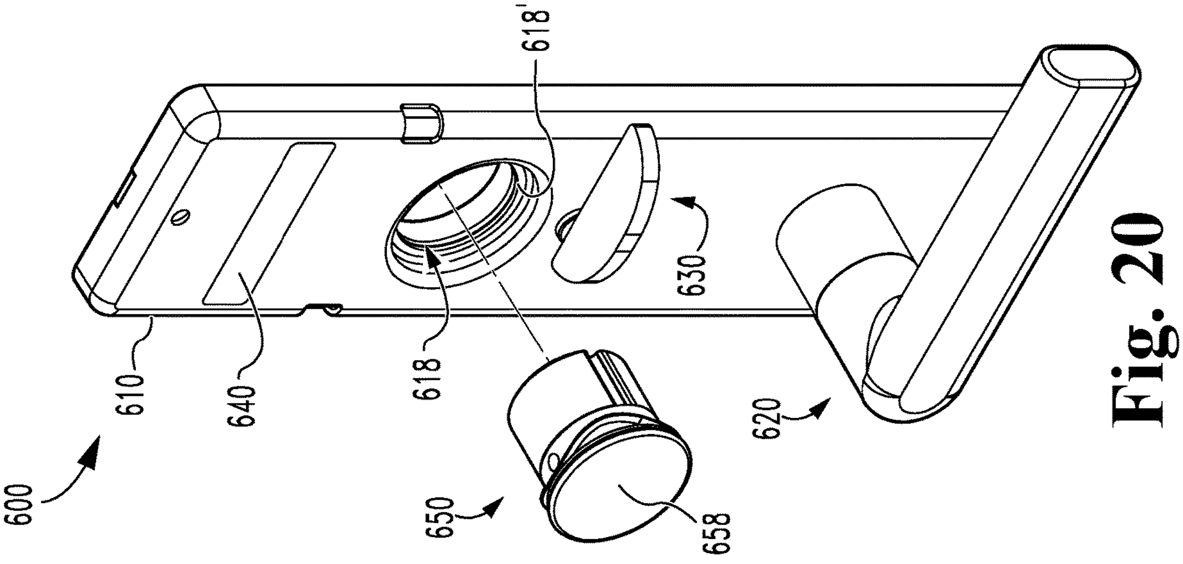
FIG. 20 is a partially-exploded view of a trim including a cylinder according to certain embodiments.

With additional reference to FIG. 20, illustrated therein is a trim 600 according to certain embodiments. The trim 600 may, for example, be utilized in connection with the mortise chassis 100 illustrated in FIG. 1. The trim 600 includes an escutcheon 610, a handle 620, and a turnpiece 630, which function along the lines described above with reference to the above-described trims 200, 300, 400, 500. The trim 600 may further include an indicator plate 640 and a cam operable to interface with the indicator plate 640 via a cam interface to thereby drive the indicator plate 640 between a first position and a second position for indication of the locked/unlocked status of the lockset. The indicator plate 640, cam, and cam interface may take any of the forms described herein. It is also contemplated that the trim 600 may be a non-indicating trim that does not include an indicator plate 640.

Figure 21:
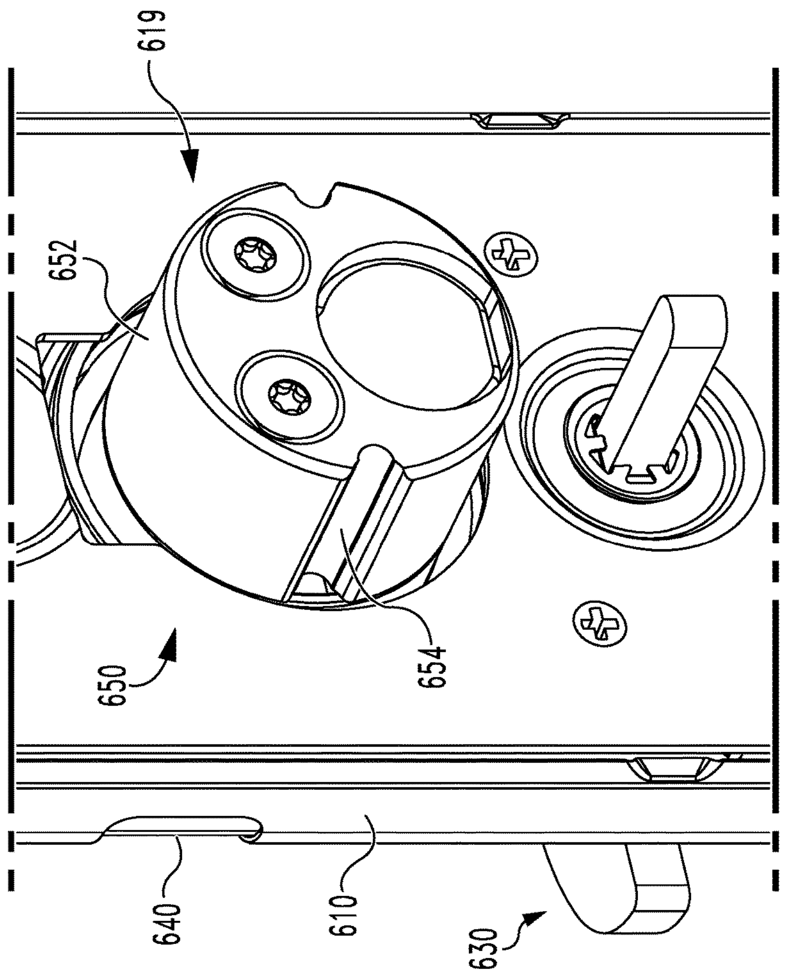
FIG. 21 is a rear perspective view of the trim illustrated in FIG. 20.

With additional reference to FIG. 21, the trim 600 also includes a cylinder 650, which is mounted in a mounting aperture 618 of the escutcheon 610. The mounting aperture 618 includes a lip 618' that interfaces with a lip of the cylinder 650 to prevent rearward movement of the cylinder 650, which may also be secured to the remainder of the trim 600, for example via an adhesive and/or one or more fasteners. The cylinder 650 extends beyond the rear plane 619 defined by the escutcheon 610 such that the rear side of the cylinder 650 is operable to extend into the circular portion 192 through a bore in the door 90.

The cylinder 650 generally includes a cylindrical body portion 652 having at least one groove 654 defined therein. In the illustrated form, the cylinder 650 includes two grooves 654 positioned diametrically opposite one another. It is also contemplated that the cylinder 650 may include more or fewer grooves 654. The illustrated cylinder 650 also includes an end cap 658 that covers the front side of the body portion 652 and substantially closes the mounting aperture 618. As described herein, the body portion 652 is sized and shaped to extend into the circular portion 192 of the mounting location 190, and is operable to be engaged by a retention mechanism to thereby secure the trim 600 relative to the mortise chassis 100. The retention mechanism may, for example, be provided in the form of the retention mechanism 700 described herein with reference to FIGS. 22-27.

In the illustrated form, the cylinder 650 is provided in the form of a dummy cylinder that is inoperable to actuate the turnhub 160. It is also contemplated that the cylinder 650 may be provided in the form of an active lock cylinder. For example, such an active lock cylinder may further include a plug rotatably mounted to the body portion 652, a tumbler assembly operable to selectively prevent rotation of the plug relative to the body portion 652, and a cam operable to rotate the turnhub 160 in response to rotation of the plug.

Figure 23:
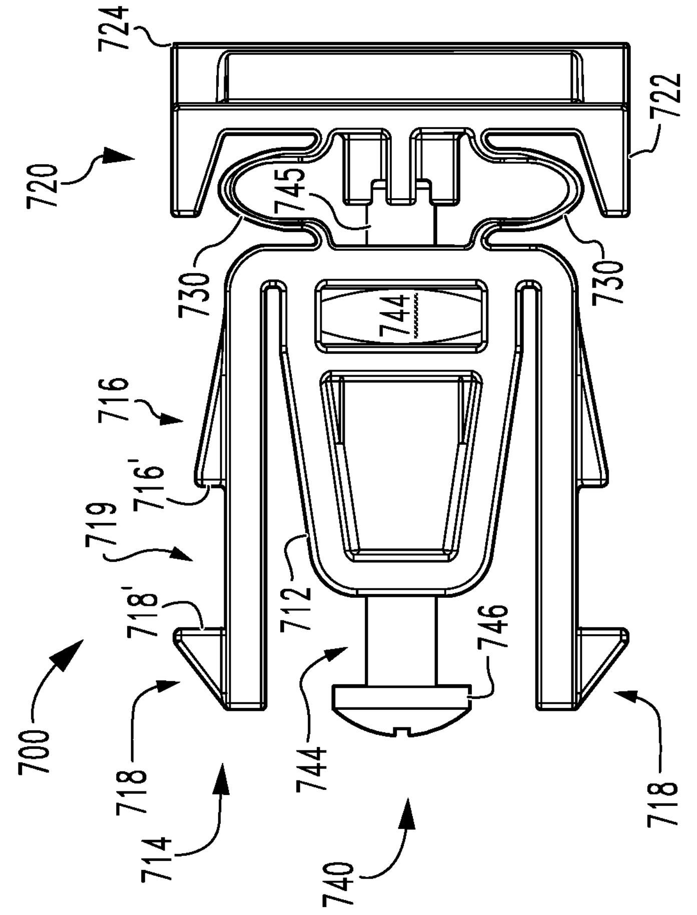
FIG. 23 is a plan view of the retention mechanism illustrated in FIG. 22.
Figure 22:
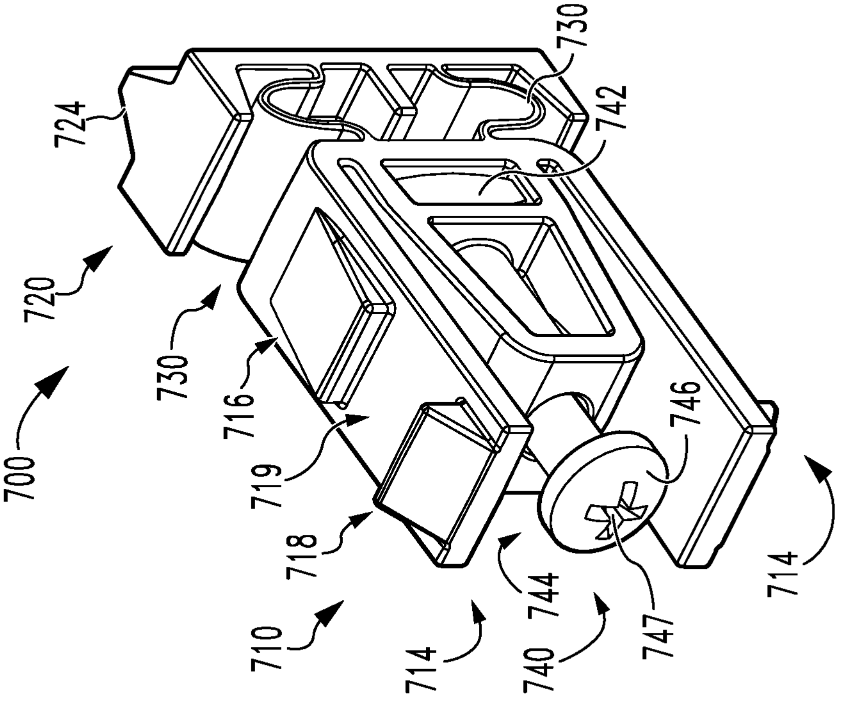
FIG. 22 is a perspective view of a retention mechanism according to certain embodiments.

With additional reference to FIGS. 22 and 23, illustrated therein is a retention mechanism 700 according to certain embodiments. The retention mechanism 700 generally includes a fixed portion 710, a movable portion 720 coupled with the fixed portion 710 via one or more flexible connectors 730, and an adjustment mechanism 740 operable to move the movable portion 720 relative to the fixed portion 710. As described herein, the retention mechanism 700 may be installed to the mortise chassis 100 in order to aid in securing the trim 600 to the mortise chassis 100.

The fixed portion 710 is configured to be secured to the housing 108 and to thereby have a fixed position relative to the housing 108. The fixed portion 710 generally includes a body 712 and a pair of flexible lever arms 714, each of which includes a first ramp 716 and a second ramp 718. The first ramp 716 is sized and shaped to be received in the first aperture 196, and includes a first shoulder 716' operable to engage an edge of the first aperture 196 to prevent shifting of the fixed portion 710 in a first lateral direction (to the left in FIG. 1). The second ramp 718 is sized and shaped to be received in the second aperture 198, and includes a second shoulder 718' operable to engage an edge of the second aperture 198 to prevent shifting of the fixed portion 710 in a second lateral direction (to the right in FIG. 1). The first shoulder 716' and the second shoulder 718' face one another such that a gap 719 is formed therebetween. The gap 719 receives a bridge 199 between the first aperture 196 and the second aperture 198.

The movable portion 720 is movable relative to the fixed portion 710, and includes a body portion 722 and a ridge 724 that extends along the body portion 722. As described in further detail below, the ridge 724 is sized and shaped to engage the groove 654 of the cylinder 650 to thereby limit shifting of the trim 600 relative to the mortise chassis 100.

The flexible connectors 730 extend between and connect the fixed portion 710 and the movable portion 720. In certain embodiments, the flexible connectors 730 may bias the movable portion 720 toward the fixed portion 710.

The illustrated adjustment mechanism 740 generally includes a nut 742 and a screw 744 threaded into the nut 742. The nut 742 is secured to the fixed portion 710, and the screw 744 extends through the nut 742 and the fixed portion 710 such that a tip 745 of the screw 744 is operable to engage the movable portion 720. Rotation of the screw 744 in a first or advancing direction advances the screw 744 and urges the movable portion 720 away from the fixed portion 710. Rotation of the screw in a second or withdrawing direction withdraws the screw 744 such that the movable portion 720 is operable to move toward the fixed portion 710, such as under a bias force exerted by the flexible connectors 730. The head 746 of the screw 744 may include a recess 747 configured to receive the tip of a tool (e.g., a hex key or a screwdriver) by which the screw 744 can be rotated.

Figure 24:
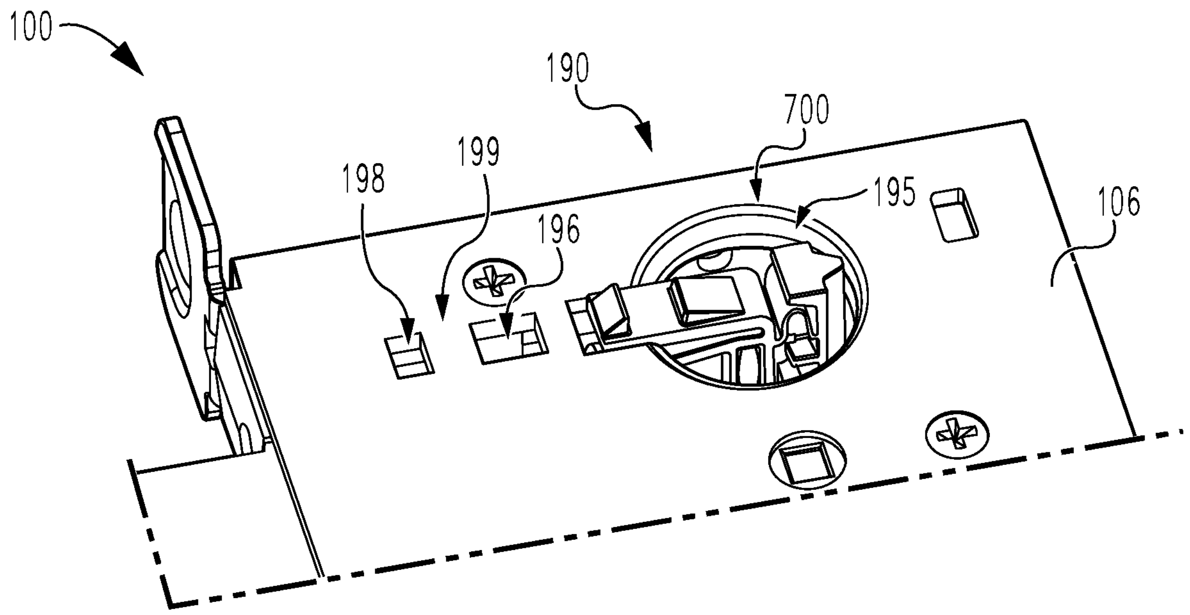
FIG. 24 is a perspective view of a mortise chassis during a first stage of installation of the retention mechanism illustrated in FIG. 22.
Figure 25:
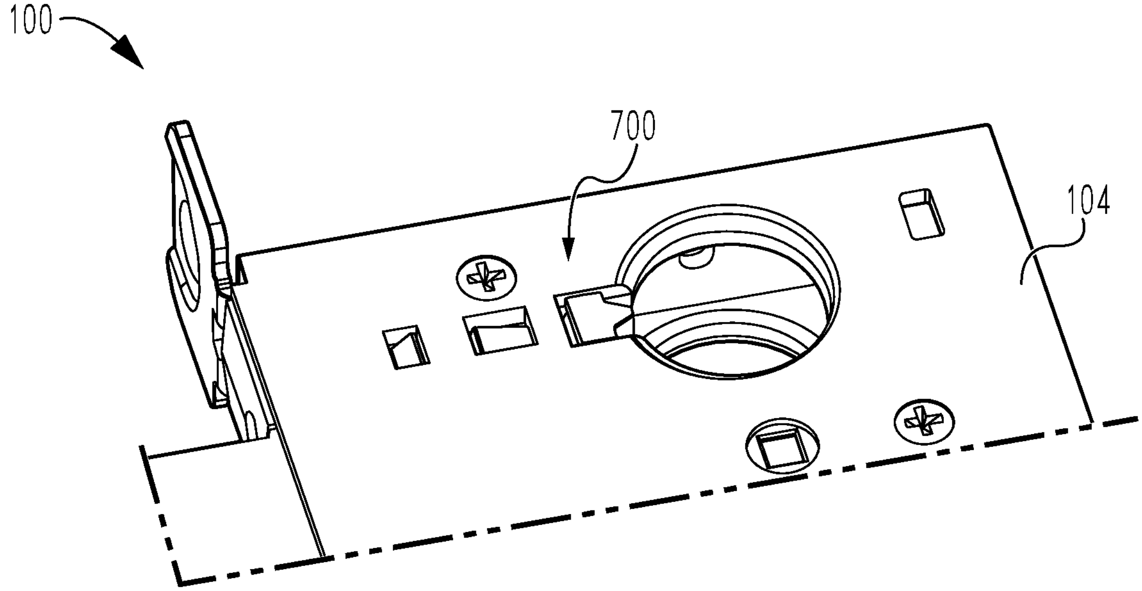
FIG. 25 is a perspective view of a mortise chassis during a second stage of installation of the retention mechanism illustrated in FIG. 22.

With additional reference to FIGS. 24 and 25, illustrated therein is the mortise chassis 100 and the retention mechanism 700 during installation of the retention mechanism 700 to the mortise chassis 100. The retention mechanism 700 is first placed in the aperture 195 with the fixed portion 710 facing the apertures 196, 198 (FIG. 24). The flexible arms 714 may then be depressed inward to provide clearance for the fixed portion 710, and the retention mechanism 710 may be urged laterally outward (generally to the left in FIGS. 24 and 25) until each ramp 716, 718 aligns with the corresponding aperture 196, 198. When so aligned, the flexible arms 714 return to their projected positions, thereby securing the bridge 199 within the gap 719 and preventing shifting of the fixed portion 710 relative to the case 102.

Figure 26:
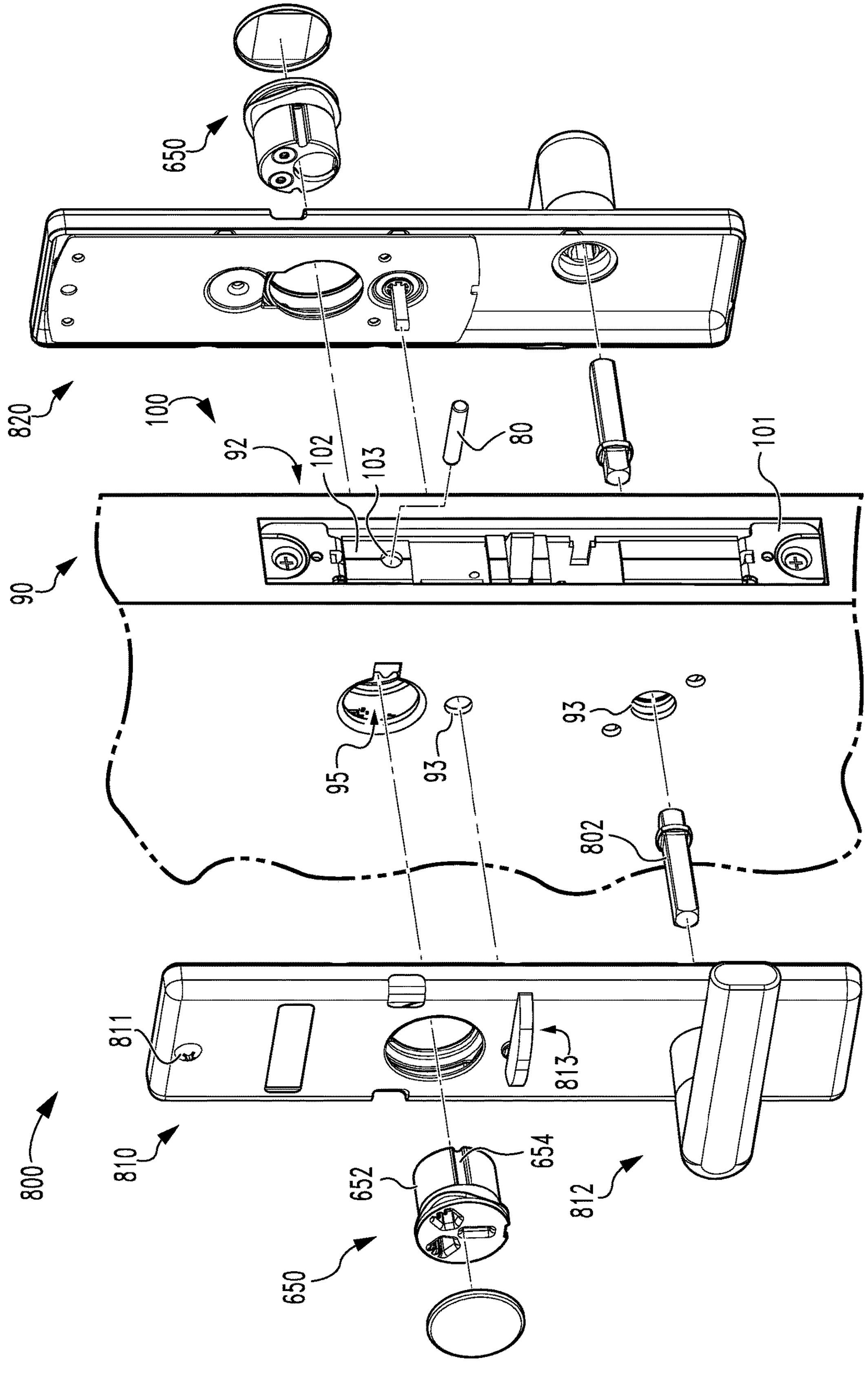
FIG. 26 is an exploded assembly view of a lockset according to certain embodiments.
Figure 27:
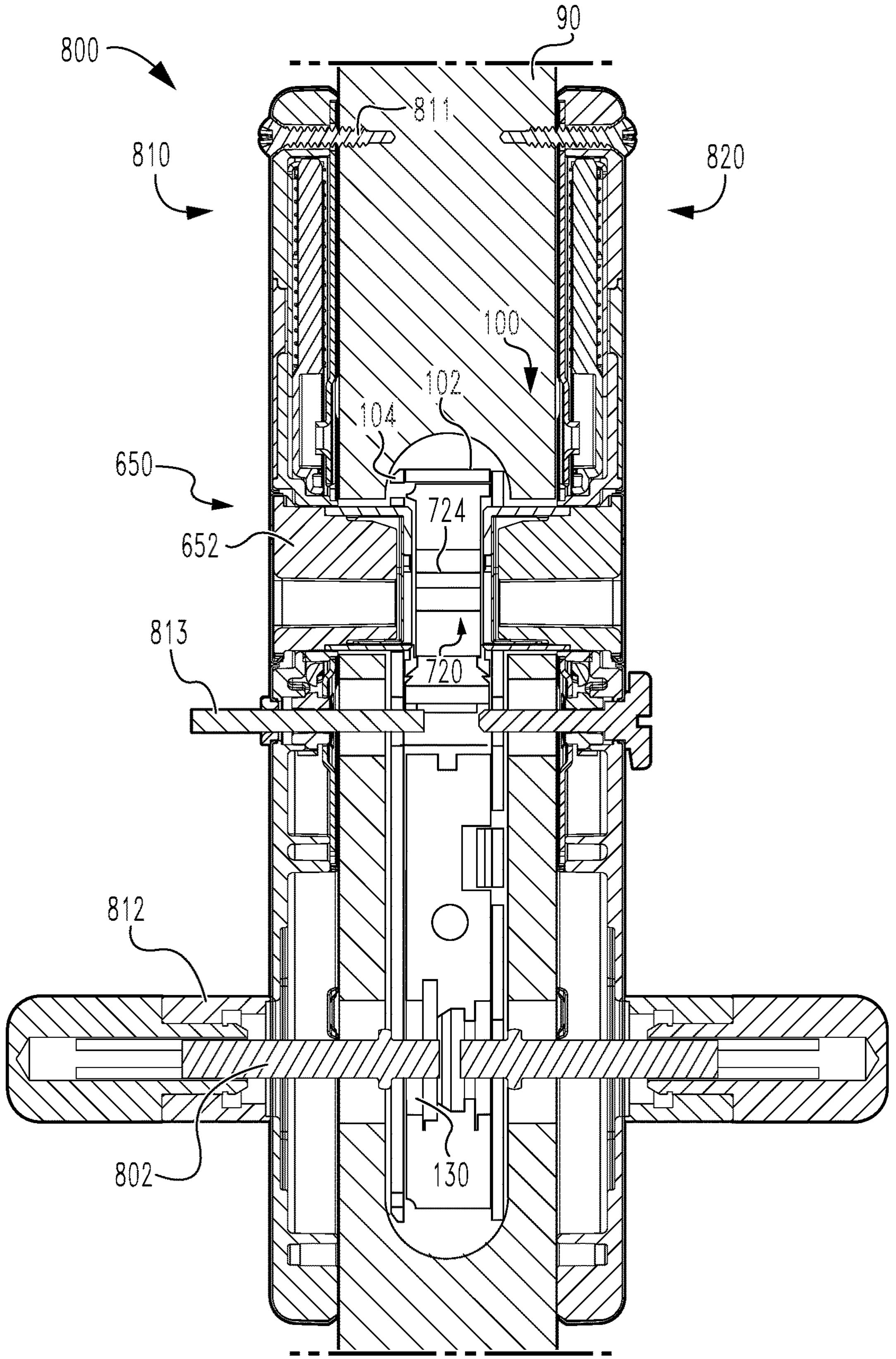
FIG. 27 is a cross-sectional view of the lockset illustrated in FIG. 26.

With additional reference to FIG. 26, illustrated therein is a lockset 800 according to certain embodiments. The lockset 800 generally includes the mortise chassis 100, in which the retention mechanism 700 is installed, an inside trim 810, and an outside trim 830. The inside trim 810 and/or the outside trim 820 may, for example, be provided in the form of the above-described trim 600, which may, for example, take the form of any of the previously-described trims 200, 300, 400, 500. At least one of the trims 810, 820 includes the above-described cylinder 650, and in the illustrated form each of the cylinders 650 is provided as a dummy cylinder. It is also contemplated that one or both of the cylinders 650 may be provided as an active lock cylinder as described above.

During installation of the lockset 800, the retention mechanism 700 may be installed to the mortise chassis 100, for example along the lines set forth above. The assembled mortise chassis 100, including the installed retention mechanism 700, may then be inserted into the mortise pocket 92 of the door 90. With the mortise chassis 100 so situated, one or both of the trims 810, 820 may be placed in engagement with the mortise chassis 100. For example, engagement of the inside trim 810 with the mortise chassis 100 may involve engaging the inside handle 812 with the inside hub 130 via a spindle 802 that extends through a first bore 93, extending the stem of the inside turnpiece 813 through a second bore 94 to engage the turnhub 160, and inserting an end portion of the cylinder body 852 into the circular portion 192 via a third bore 95. The inside trim 810 may be secured to the door 90 via one or more fasteners 811, and installation of the outside trim 820 may proceed along similar lines.

With the lockset 800 in a partially installed state in which at least one trim 810, 820 is engaged with the mortise chassis 100, each trim 810, 820 may be secured to the door 90 while the mortise chassis 100 is seated in the mortise pocket 92. In this state, the mortise chassis 100 may remain capable of shifting or drifting from its seated position, which may cause the lockset 800 to malfunction and/or appear to be of lesser quality. In order to address this drift, the user may insert the tip of a tool 80 (e.g., a hex key or a screwdriver) into an opening 103 formed in the edge face of the mortise case 102 such that the tool 80 enters the recess 747 for engagement with the screw 744. The tool 80 may then be rotated in the advancing direction to thereby cause the movable portion 720 to move laterally away from the fixed portion 710. As the movable portion 720 moves laterally inward and away from the fixed portion 710, the ridge 724 enters the groove 654 of the cylinder body 652 and drives the cylinder body 652 into engagement with the opposite edge of the circular portion 192. The cylinder body 652 is thus captured between the retention mechanism 700 and the housing 108 to thereby discourage relative shifting of the trim 810 and the mortise chassis 100.

Certain existing approaches to installing mortise locksets require the use of a template. Such a template may, for example, be utilized to drill holes in appropriate locations of the door to alleviate misalignment concerns. In certain forms, the systems and methods described herein may obviate the need for such a template. For example, the illustrated lockset 800 may be installed without a template due to the firm coupling of the cylinder 650 with the mortise housing 108 via the retention mechanism 700. With the trim so coupled to the mortise chassis 100, the number of fasteners used to secure the trim to the door 90 may be reduced. In the illustrated form, a single fastener 811 is utilized to secure the trim 810 to the door 90. It is also contemplated that more (e.g., two) or fewer (e.g., zero) fasteners may be utilized to secure the trim 810 to the door 90.

In certain existing locksets, a spindle is provided with multiple weak points that permit the spindle to be broken to a desired length based on the thickness of the door to which the lockset will be installed. However, it has been found that installers frequently forget to break the spindle to length, which may cause issues such as binding. Certain embodiments of the present application may aid in alleviating this concern.

Figure 28:
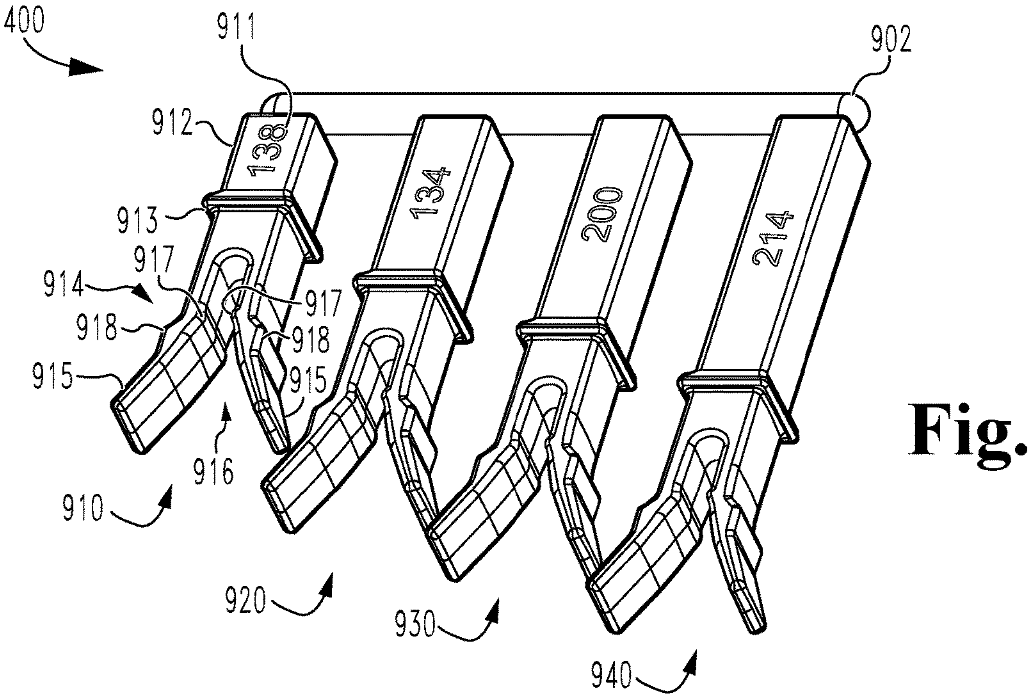
FIG. 28 is a perspective view of a spindle selection kit according to certain embodiments.

With additional reference to FIG. 28, illustrate therein is a spindle selection kit 900 according to certain embodiments. The spindle selection kit 900 includes a plurality of spindles 910, 920, 930, 940, each of which may be frangibly coupled with a base portion 902. The term "frangibly coupled" may be used herein to indicate that a first component (e.g., a spindle) is coupled with a second component (e.g., a base portion), and that a point, line, or region of relative weakness is provided between the first component and the second component to facilitate the decoupling of the first component and the second component by breaking at the point, line, or region of relative weakness.

A first spindle 910 generally includes a body 912, a fork 914 opposite the body 912, and a lip 913 separating the body 912 from the fork 914. The spindle 910 may further include indicia 911 that aid the installer in selecting the appropriate spindle from the kit 900. The body 912 is configured to extend from a cam (e.g., the cam 250) into the recess 163 of the turnhub 160, and the lip 913 engages the rear side of the cam to thereby block forward movement of the spindle 910. The fork 914 includes a pair of flexible arms 915 having a slot 916 defined therebetween. During installation, the arms 915 are first depressed, then inserted into the aperture of the cam (e.g., the aperture 253 of the cam 250). The arms 915 may be self-biased away from one another such that when the fork 914 is received within the cam aperture, the arms 915 flex away from one another and secure the spindle 910 to the cam. The stem of a turnpiece (e.g., the turnpiece 230) may then be inserted into the slot 916 to thereby rotationally couple the turnpiece with the cam, the spindle, and the turnhub 160.

Each of the remaining spindles 920, 930, 940 is substantially similar to the first spindle 910, and includes a body, a fork, and a lip 913 separating the body from the fork. One difference between the spindles 910, 920, 930, 940 is the length of the bodies. More particularly, the body of each spindle has a corresponding length, and the lengths of the bodies are different from one another. The spindles 910, 920, 930, 940 may include indicia that aid the installer in selecting the appropriate spindle from the kit 900. Once the appropriate spindle is selected, the installer may break the selected spindle from the base portion 902 and install the selected spindle along the lines set forth herein.

Figure 29:
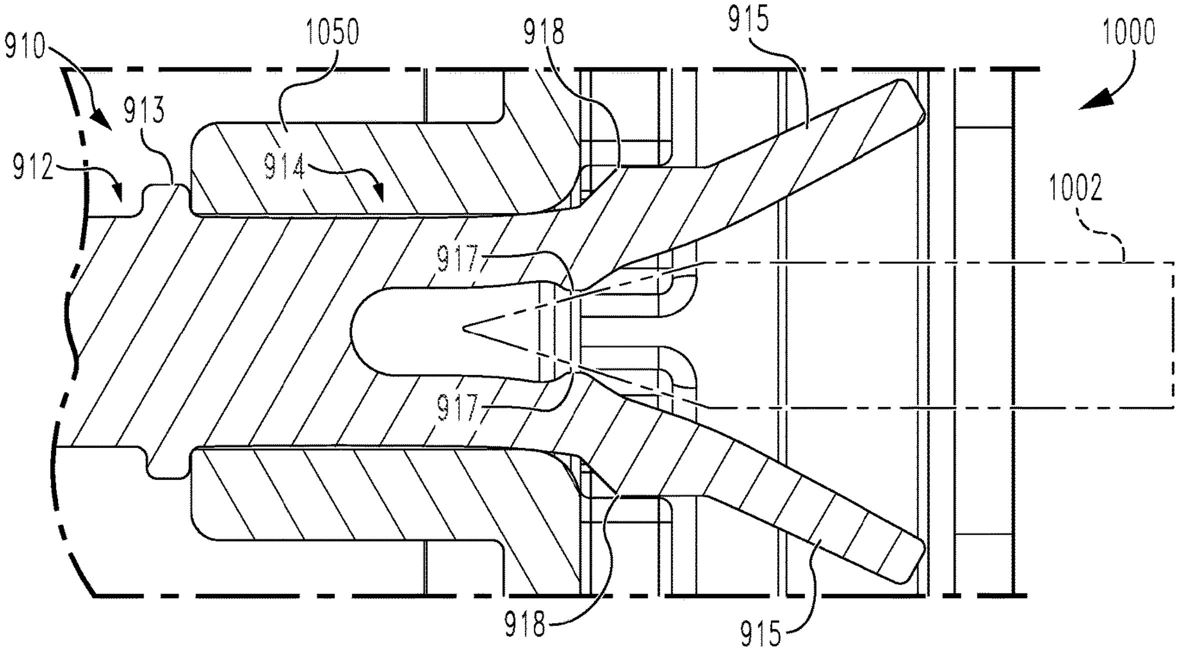
FIG. 29 is a cross-sectional view of a portion of a lockset according to certain embodiments.

With additional reference to FIG. 29, illustrated therein is a portion of a trim 1000 according to certain embodiments. The trim 1000 includes a cam 1050 that may, for example, be provided in the form of one or more of the above-described cams 250, 350, 450, 550. In the illustrated state, the first spindle 910 has been removed from the base portion 902 and installed to the cam 1050 in a manner analogous to that described above. Additionally, a user attempting to tamper with the trim 1000 has removed the turnpiece to expose the fork 914, and inserted a tampering tool 1002 in an effort to push the spindle 910 further into the lockset 100. However, such tampering is discouraged by the spindle 910. More particularly, each of the arms 915 is provided with an inner ridge 917 facing the other arm 915, and an outer ridge 918 facing away from the other arm 915. Upon insertion of the tool 1002 into the slot 916, the tool 1002 engages the inner ridges 917 and becomes clamped between the arms 915 such that the tool 1002 prevents further depression of the arms 915. As a result, the outer ridges 918 engage the cam 1050 and prevent inward movement of the spindle 910.

Figure 30:
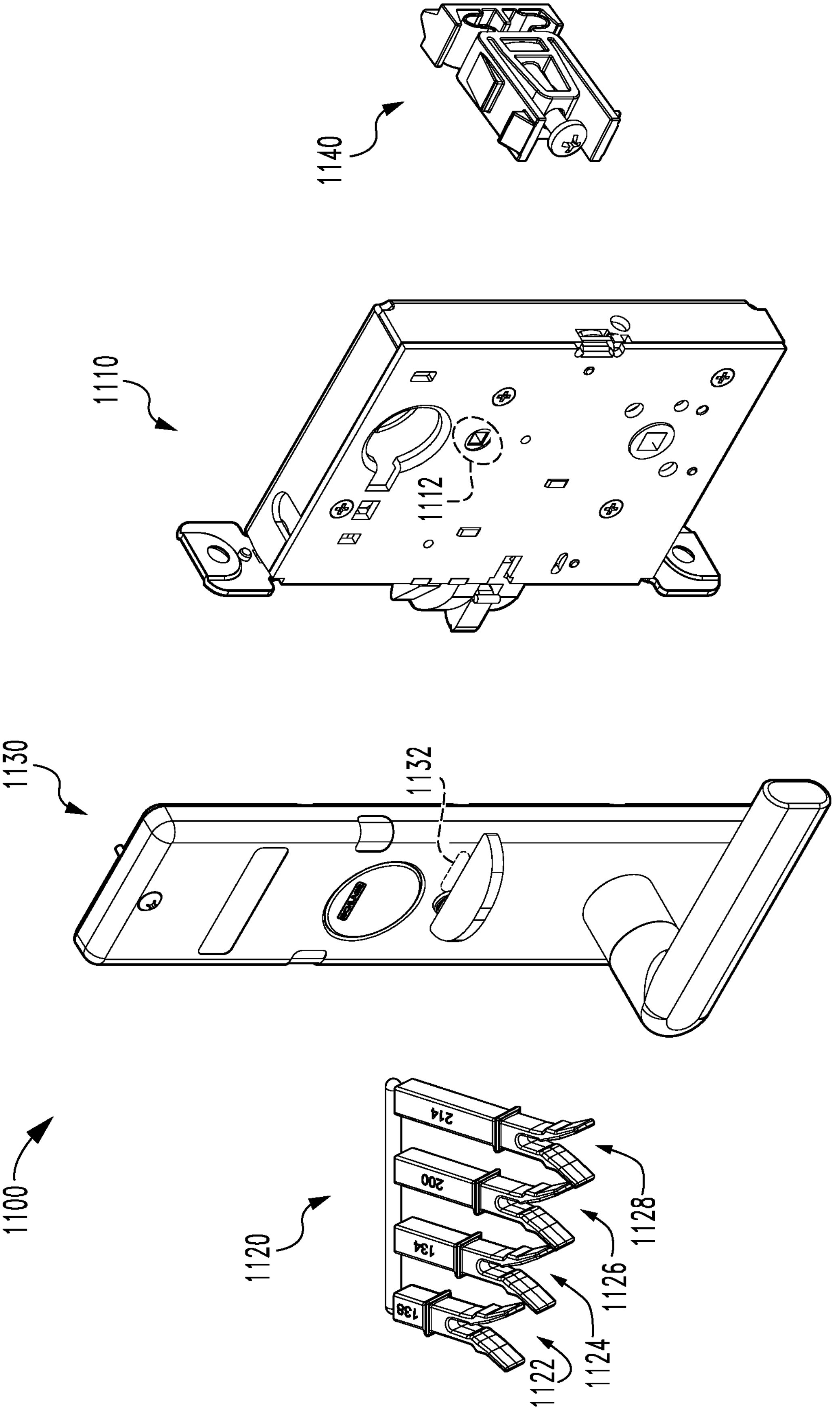
FIG. 30 illustrates a lockset kit according to certain embodiments.

With additional reference to FIG. 30, illustrated therein is a lockset kit 1100 according to certain embodiments. The illustrated lockset kit 1100 generally includes a mortise chassis 1110 such as the mortise chassis 100, a spindle selection kit 1120 such as the spindle selection kit 900, and a trim 1130. In the illustrated form, the trim 1130 is provided in the form of the trim 200 illustrated in FIGS. 2-7. It is also contemplated that the trim 1130 may be provided in another form, such as that of the trim 300 illustrated in FIGS. 8-11, that of the trim 400 illustrated in FIGS. 12-15, that of the trim 500 illustrated in FIGS. 16-19, and/or that of the trim 600 illustrated in FIGS. 20-21. In addition or as an alternative to the spindle selection kit 900 embodiments, the lockset kit 1100 may include a retention mechanism 1140, such as the retention mechanism 700.

The mortise chassis 1110 includes a rotatable component 1112, which may, for example, take the form of the hub 130 or the turnhub 160. The spindle selection kit 1120 includes a plurality of spindles 1122, 1124, 1126, 1128, which respectively correspond to the above-described spindles 910, 920, 930, 940. The trim 1130 includes a cam 1132, which may, for example, take the form of any of the above-described cams 250, 350, 450, 550, 650. As will be appreciated, the lockset kit 1100 is configured to be assembled and installed to a door as a lockset such as the lockset 800. Such installation may be facilitated by the fact that each of the spindles 1122, 1124, 1126, 1128 is operable to connect the rotatable component 1112 with the cam 1132.

Figure 31:
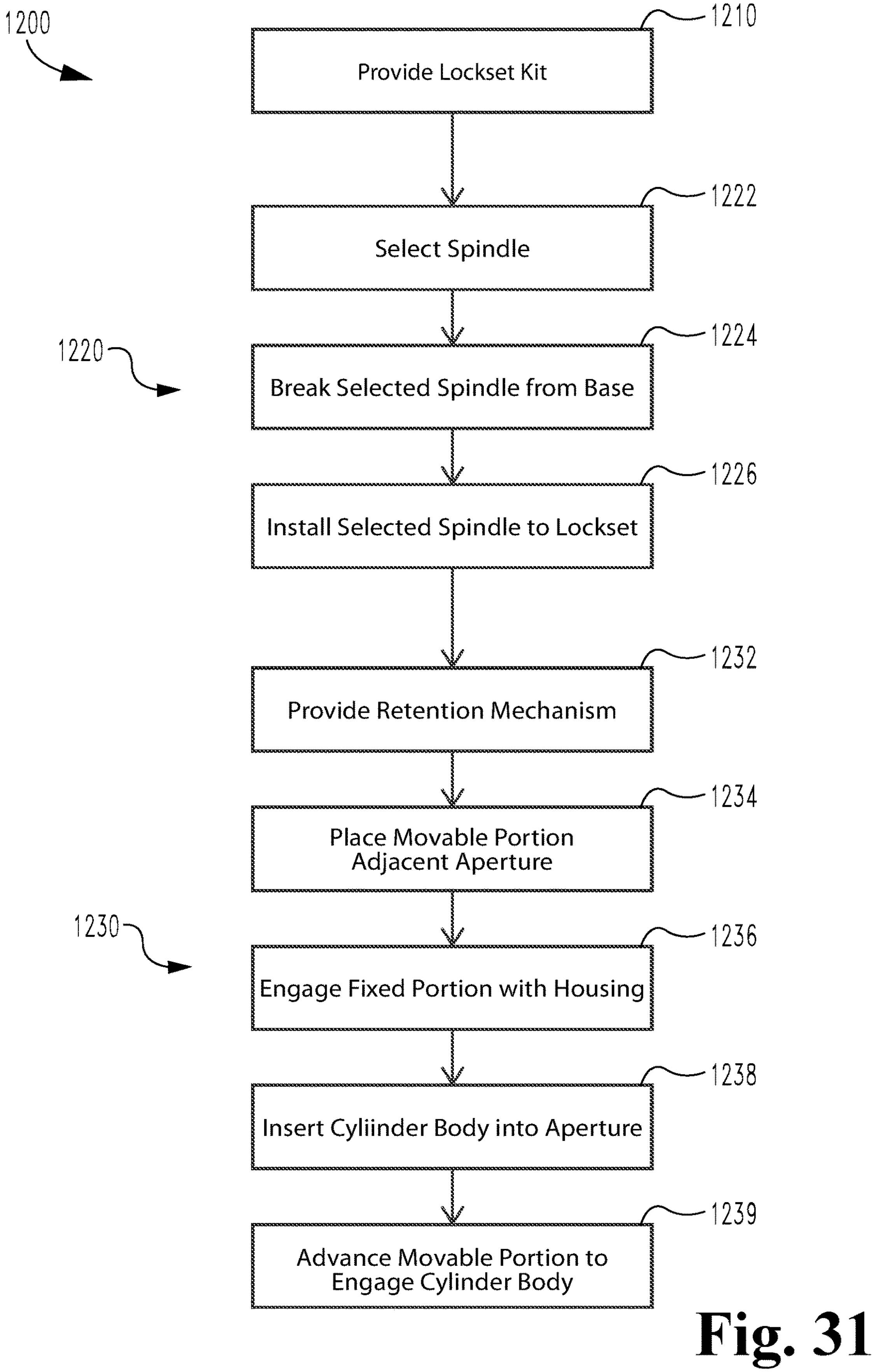
FIG. 31 is a schematic flow diagram of a process according to certain embodiments.

With additional reference to FIG. 31, illustrated therein is a process 1200 according to certain embodiments. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 1200 is described herein with specific reference to the lockset kit 1100 illustrated in FIG. 30, it is to be appreciated that the process 1200 may be performed with kits having additional and/or alternative features.

The process 1200 may begin with block 1210, which generally involves providing a lockset kit. Block 1210 may, for example, involve providing the lockset kit 1100 illustrated in FIG. 30. The lockset kit provided in block 1210 may include a mortise chassis 1110 and a trim 1130, and may further include a spindle selection kit 1120 and/or a retention mechanism 1140.

In certain embodiments, the process 1200 may include a spindle selection and installation procedure 1220. The procedure 1220 may begin with block 1222, which generally involves selecting a spindle from the spindle selection kit. The spindle selection kit from which the spindle is selected in block 1222 includes a plurality of spindles, such as the spindles 910, 920, 930, 940. Each spindle has a corresponding and respective length, and the lengths of at least two of the spindles are different from one another. Each spindle comprises a first portion sized and shaped to engage a cam of the trim, and a second portion sized and shaped to engage a rotatable component of the chassis. For example, the first spindle 910 includes a first portion 914 sized and shaped to engage the cam 1132 of the trim 1130, and a second portion 912 sized and shaped to engage the rotatable component 1112 of the chassis 1110.

In certain embodiments, each of the spindles comprises a corresponding and respective indicium, and block 1222 comprises selecting the selected spindle based upon the indicia. In certain embodiments, the selecting of block 1220 is based at least in part upon the thickness of the door to which the lockset is to be installed.

In certain embodiments, the first portion of each spindle comprises a fork including two flexible arms that are biased away from one another. For example, the first portion 914 of the first spindle 910 comprises a fork 914 including two flexible arms 915 that are biased away from one another. In certain embodiments, each flexible arm 915 includes an inner ridge 917 facing toward the other flexible arm 915. Additionally or alternatively, each flexible arm 915 may include an outer ridge 918 facing away from the other flexible arm.

In certain embodiments, such as those in which the spindles 910, 920, 930, 940 are frangibly connected with a base portion 902, the process 1200 may proceed from block 1220 to block 1224, which generally involves breaking the selected spindle from the base portion.

The spindle selection and installation procedure 1220 further includes block 1226, which generally involves installing the selected spindle to a lockset comprising a trim and a chassis. More particularly, block 1226 involves engaging the first portion of the selected spindle with the cam, and engaging the second portion of the selected spindle with the rotatable component. For example, block 1226 may involve engaging the first portion 914 of the selected spindle 910 with the cam 1132, and engaging the second portion 912 of the selected spindle 910 with the rotatable component 1112.

In addition or as an alternative to the spindle selection and installation procedure 1220, the process 1200 may include a retention mechanism installation procedure 1230. The procedure 1230 may begin with block 1232, which generally involves providing a retention mechanism comprising a fixed portion, a movable portion, and an adjustment mechanism operable to move the movable portion relative to the fixed portion. For example, block 1232 may involve providing the retention mechanism 700, which generally comprises a fixed portion 710, a movable portion 720, and an adjustment mechanism 740 operable to move the movable portion 720 relative to the fixed portion 710.

The retention mechanism installation procedure 1230 may include block 1234, which generally involves placing the movable portion adjacent an aperture of the housing. For example, block 1234 may involve placing the movable portion 720 adjacent the aperture 192 of the housing 108. The retention mechanism installation procedure 1230 may further include block 1236, which generally involves securing the fixed portion a housing of the lockset chassis. For example, block 1236 may involve securing the fixed portion 710 to the housing 108, such as by engaging the ramps 716, 718 of the flexible arms 714 with the appropriate apertures 196, 198.

In certain embodiments, the procedure 1230 may further include block 1238, which generally involves inserting at least a portion of a cylinder body of the trim in the aperture. For example, block 1238 may involve inserting a portion of the cylinder body 652 within the aperture 195.

The procedure 1230 may include block 1239, which generally involves advancing the movable portion relative to the fixed portion such that the movable portion engages the cylinder body, thereby securely engaging the trim and the lockset chassis. For example, block 1239 may involve operating the adjustment mechanism 740 to advance the movable portion 720 relative to the fixed portion 710 such that the movable portion 720 engages the cylinder body 652, thereby securely engaging the trim 1130 (e.g., the trim 600) and the lockset chassis 1110 (e.g., the lockset chassis 100) with one another. In certain embodiments, advancing the movable portion relative 710 to the fixed portion 720 comprises rotating a screw 744 while maintaining a nut 742 in a fixed orientation relative to the fixed portion 710 such that the screw 744 moves the movable portion 720 into engagement with the cylinder body 652 as the screw 744 is rotated relative to the nut 742. In certain embodiments, block 1239 may involve inserting a tool 80 through an aperture 103 in the face 101 of the mortise chassis 100 such that the tool 80 engages the screw 744, and rotating the tool 80 to thereby rotate the screw 744.

Certain embodiments of the present application relate to a trim, comprising: an escutcheon including an escutcheon window; an indicator plate movably mounted in the escutcheon, the indicator plate having a first position in which a first indicium is aligned with the escutcheon window, and a second position in which a second indicium is aligned with the escutcheon window; a cam rotatably mounted in the escutcheon for rotation between a first handing orientation and a second handing orientation different from the first handing orientation, wherein the cam is operable to move the indicator plate between the first position and the second position when the cam is in the first handing orientation, and wherein the cam is operable to move the indicator plate between the first position and the second position when the cam is in the second handing orientation; and a backplate coupled to the escutcheon and at least partially enclosing the indicator plate within the escutcheon; and wherein the cam is operable to rotate between the first handing orientation and the second handing orientation while the backplate remains coupled to the escutcheon.

In certain embodiments, the backplate comprises a backplate window; and wherein at least a portion of the cam is visible via the backplate window during at least a portion of a rotation of the cam between the first handing orientation and the second handing orientation.

In certain embodiments, the trim further comprises a cam interface through which the cam engages the indicator plate; wherein the cam interface comprises a first cam interface portion and a second cam interface portion spaced apart from the first cam interface portion; wherein, with the cam in the first handing orientation, the cam is configured to cause the indicator plate to move between the first position and the second position by engaging with the first cam interface portion; and wherein, with the cam in the second handing orientation, the cam is configured to cause the indicator plate to move between the first position and the second position by engaging with the second cam interface portion.

In certain embodiments, the first cam interface portion and the second cam interface portion are open to one another.

Certain embodiments of the present application relate to a method of operating a handed trim comprising a cam, an indicator plate, and a cam interface operable to move the indicator plate in response to rotation of the cam, the method comprising: with the handed trim in a first handing configuration and the cam in a first handing orientation, rotating the cam about a rotational axis between a first locking position and a first unlocking position, thereby causing a first portion of the cam interface to move the indicator plate between a lock-indicating position and an unlock-indicating position; selectively altering a handedness of the handed trim from the first handing configuration to a second handing configuration, comprising rotating the cam about the rotational axis from the first handing orientation to a second handing orientation different from the first handing orientation without moving the cam along the rotational axis; and with the handed trim in the second handing configuration and the cam in the second handing orientation, rotating the cam about the rotational axis between a second locking position and a second unlocking position, thereby causing a second portion of the cam interface to move the indicator plate between the lock-indicating position and the unlock-indicating position.

In certain embodiments, the trim further includes an escutcheon and a backplate coupled to the escutcheon; wherein the cam is captured between the escutcheon and the backplate; and wherein the backplate remains coupled to the backplate during rotation of the cam from the first handing orientation to the second handing orientation.

In certain embodiments, the trim further includes an escutcheon and a backplate coupled to the escutcheon; and wherein altering the handedness of the handed trim further comprises confirming a direction of rotation of the cam by viewing at least a portion of the cam via a window in the backplate.

In certain embodiments, the first portion of the cam interface is open to the second portion of the cam interface.

In certain embodiments, the first locking position is different from the second locking position.

In certain embodiments, the first unlocking position is different from the second unlocking position.

In certain embodiments, rotating the cam about the rotational axis from the first handing orientation to the second handing orientation comprises rotating the cam through a neutral position; and wherein at least a portion of the cam is visible as the cam rotates through the neutral position.

Certain embodiments of the present application relate to a trim configured for use in a lockset having a first handing configuration and a second handing configuration, the trim comprising: an escutcheon including a window; an indicator plate movably mounted in the escutcheon, the indicator plate having a first position in which a first indicium is aligned with the escutcheon window, and a second position in which a second indicium is aligned with the escutcheon window; a cam rotatably mounted in the escutcheon for rotation between a first rotated position, a second rotated position, and a neutral position between the first rotated position and the second rotated position; and a cam interface including a first cam interface portion and a second cam interface portion, wherein the indicator plate is operable to engage the cam via the cam interface; wherein, during rotation of the cam between the neutral position and the first rotated position, the cam engages the first cam interface portion and thereby drives the indicator plate between the first position and the second position; and wherein, during rotation of the cam between the neutral position and the second rotated position, the cam engages the second cam interface portion and thereby drives the indicator plate between the first position and the second position.

In certain embodiments, the cam interface is configured to prevent the indicator plate from moving the cam from the neutral position.

In certain embodiments, the cam interface is configured to prevent the indicator plate from moving the cam from the first rotated position and/or from the second rotated position.

In certain embodiments, the indicator plate is biased toward the first position.

In certain embodiments, the cam retains the indicator plate in the second position when the cam is in the neutral position.

In certain embodiments, the first cam interface portion is open to the second cam interface portion.

In certain embodiments, the cam comprises: a first engagement portion operable to engage the first cam interface portion; and a second engagement portion operable to engage the second cam interface portion.

In certain embodiments, the cam comprises a single engagement portion operable to engage each of the first cam interface portion and the second cam interface portion.

In certain embodiments, the cam interface comprises an arcuate wall that is arcuate about a rotational axis of the cam.

Certain embodiments of the present application relate to a method, comprising: installing a retention mechanism to a lockset chassis, wherein installing the retention mechanism comprises: placing a movable portion of the retention mechanism adjacent an aperture of a housing of the lockset chassis; and securing a fixed portion of the retention mechanism to the housing; inserting at least a portion of a cylinder body of a trim in the aperture; and advancing the movable portion relative to the fixed portion such that the movable portion engages the cylinder body, thereby securely engaging the trim and the lockset chassis.

In certain embodiments, advancing the movable portion relative to the fixed portion comprises rotating a screw while maintaining a nut in a fixed orientation relative to the fixed portion such that the screw moves the movable portion into engagement with the cylinder body as the screw is rotated relative to the nut.

In certain embodiments, the method further comprises inserting a tool through an aperture in a face of the mortise chassis such that the tool engages the screw; wherein rotating the screw comprises rotating the tool.

Certain embodiments of the present application relate to a retention mechanism configured for use with a mortise chassis, the retention mechanism comprising: a fixed portion configured to maintain a fixed position relative to a housing of the mortise chassis, the fixed portion comprising a flexible arm configured to engage the housing; a movable portion movably connected with the fixed portion; and an adjustment mechanism operable to move the movable portion relative to the fixed portion.

In certain embodiments, the fixed portion comprises a nut; wherein the adjustment mechanism comprises a threaded member threadedly engaged with the nut; and wherein the threaded member is configured to move the movable portion away from the fixed portion as the threaded portion rotates relative to the nut.

In certain embodiments, the movable portion is coupled with the fixed portion via at least one flexible connector.

In certain embodiments, the movable portion comprises a ridge operable to engage a groove of a cylinder body.

In certain embodiments, the flexible arm comprises a first ramp including a first shoulder facing in a first direction.

In certain embodiments, the flexible arm further comprises a second ramp including a second shoulder facing in a second direction opposite the first direction.

In certain embodiments, the first shoulder and the second shoulder face one another such that a gap is formed between the first shoulder and the second shoulder.

Certain embodiments of the present application relate to a method, comprising: selecting a spindle from a spindle selection kit comprising a plurality of spindles, wherein each spindle has a corresponding and respective length, and wherein the lengths of at least two of the spindles are different from one another; and installing the selected spindle to a lockset comprising a trim and a chassis; wherein each spindle comprises: a corresponding and respective first portion sized and shaped to engage a cam of the trim; and a corresponding and respective second portion sized and shaped to engage a rotatable component of the chassis; and wherein installing the spindle to the lockset comprises: engaging the first portion of the selected spindle with the cam; and engaging the second portion of the selected spindle with the rotatable component.

In certain embodiments, selecting the spindle comprises selecting the spindle based at least in part upon a thickness of a door to which the lockset is to be installed.

In certain embodiments, each spindle further comprises a corresponding and respective indicium; and wherein selecting the spindle comprises selecting the spindle based at least in part upon the indicium.

In certain embodiments, the first portion of each spindle comprises a fork including two flexible arms that are biased away from one another.

In certain embodiments, each flexible arm comprises an inner ridge facing toward the other flexible arm.

In certain embodiments, each flexible arm comprises an outer ridge facing away from the other flexible arm.

In certain embodiments, the spindle kit further comprises a base portion to which each of the spindles is frangibly coupled; and wherein the method further comprises breaking the selected spindle from the base portion.

Certain embodiments of the present application relate to a spindle kit for a lockset comprising a trim and a chassis, the spindle kit comprising: a plurality of spindles, wherein each spindle comprises: a corresponding and respective first portion sized and shaped to engage a cam of the trim; and a corresponding and respective second portion sized and shaped to engage a rotatable component of the chassis; wherein each spindle has a corresponding and respective length; and wherein the lengths of at least two spindles of the plurality of spindles are different from one another.

In certain embodiments, the first portions of the spindles differ in length; and wherein the second portions of the spindles are of a single configuration.

In certain embodiments, the spindle kit further comprises a base portion; and wherein each of the spindles is frangibly coupled to the base portion.

In certain embodiments, the first portion of each spindle comprises a fork including two flexible arms that are biased away from one another.

In certain embodiments, each flexible arm comprises an inner ridge facing toward the other flexible arm.

In certain embodiments, each flexible arm comprises an outer ridge facing away from the other flexible arm.

Certain embodiments of the present application relate to a lockset kit comprising the spindle kit, the lockset kit further comprising: the trim, wherein the trim comprises the cam; and the lockset chassis, wherein the lockset chassis comprises the rotatable component; and wherein the cam is operable to be coupled with the rotatable component via each individual spindle of the plurality of spindles.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A trim, comprising:

an escutcheon including an escutcheon window;

an indicator plate movably mounted in the escutcheon, the indicator plate having a first position, in which a first indicium is aligned with the escutcheon window, and a second position, in which a second indicium is aligned with the escutcheon window;

a cam comprising a body portion and an arm extending from the body portion, wherein the cam is rotatably mounted in the escutcheon for rotation about an axis extending through the body portion between a first handing orientation and a second handing orientation different from the first handing orientation, wherein the cam is operable to move the indicator plate between the first position and the second position when the cam is in the first handing orientation, and wherein the cam is operable to move the indicator plate between the first position and the second position when the cam is in the second handing orientation; and a backplate coupled to the escutcheon and at least partially enclosing the indicator plate within the escutcheon, wherein the backplate comprises a backplate window;

wherein the cam is operable to rotate between the first handing orientation and the second handing orientation while the backplate remains coupled to the escutcheon; and wherein at least a portion of the arm is visible through the backplate window during at least a portion of a rotation of the cam between the first handing orientation and the second handing orientation.

2. The trim of claim 1, further comprising a cam interface through which the cam engages the indicator plate;

wherein the cam interface comprises a first cam interface portion and a second cam interface portion spaced apart from the first cam interface portion;

wherein, with the cam in the first handing orientation, the cam is configured to cause the indicator plate to move between the first position and the second position by engaging with the first cam interface portion; and wherein, with the cam in the second handing orientation, the cam is configured to cause the indicator plate to move between the first position and the second position by engaging with the second cam interface portion.

3. The trim of claim 2, wherein the first cam interface portion and the second cam interface portion are open to one another.

4. The trim of claim 1, wherein, with the cam in the first handing orientation, the cam is rotatable between a neutral position and a first rotated position;

wherein, with the cam in the second handing orientation, the cam is rotatable between the neutral position and a second rotated position; and wherein the at least a portion of the arm is visible through the backplate window at least when the cam is in the neutral position.

5. A method of operating a handed trim comprising a cam, an indicator plate with a cam interface, an escutcheon, and a backplate coupled to the escutcheon, the method comprising:

with the handed trim in a first handing configuration and the cam in a first handing orientation, rotating the cam about a rotational axis between a first locking position and a first unlocking position, thereby causing an arm of the cam to engage a first portion of the cam interface to thereby move the indicator plate between a lock-indicating position and an unlock-indicating position;

selectively altering a handedness of the handed trim from the first handing configuration to a second handing configuration, the selectively altering comprising:

rotating the cam about the rotational axis from the first handing orientation to a second handing orientation different from the first handing orientation without moving the cam along the rotational axis; and confirming a direction of rotation of the cam by viewing at least a portion of the arm through a window in the backplate; and with the handed trim in the second handing configuration and the cam in the second handing orientation, rotating the cam about the rotational axis between a second locking position and a second unlocking position, thereby causing the arm to engage a second portion of the cam interface to thereby move the indicator plate between the lock-indicating position and the unlock-indicating position.

6. The method of claim 5, wherein the cam is captured between the escutcheon and the backplate; and wherein the backplate remains coupled to the backplate during rotation of the cam from the first handing orientation to the second handing orientation.

7. The method of claim 5, wherein the first portion of the cam interface is open to the second portion of the cam interface.

8. The method of claim 5, wherein the first locking position is different from the second locking position.

9. The method of claim 5, wherein the first unlocking position is different from the second unlocking position.

10. The method of claim 5, wherein rotating the cam about the rotational axis from the first handing orientation to the second handing orientation comprises rotating the cam through a neutral position; and wherein the at least a portion of the arm of the cam is visible as the cam rotates through the neutral position.

11. A trim configured for use in a lockset having a first handing configuration and a second handing configuration, the trim comprising:

an escutcheon including an escutcheon window;

an indicator plate movably mounted in the escutcheon, the indicator plate having a first position, in which a first indicium is aligned with the escutcheon window, and a second position, in which a second indicium is aligned with the escutcheon window;

a cam rotatably mounted in the escutcheon for rotation between a first rotated position, a second rotated position, and a neutral position between the first rotated position and the second rotated position, the cam comprising a body portion and an arm extending radially from the body portion;

a backplate mounted to the escutcheon and at least partially enclosing the indicator plate within the escutcheon, wherein the backplate comprises a backplate window; and a cam interface including a first cam interface portion and a second cam interface portion, wherein the indicator plate is operable to engage the arm of the cam via the cam interface;

wherein, during rotation of the cam between the neutral position and the first rotated position, the cam engages the first cam interface portion and thereby drives the indicator plate between the first position and the second position;

wherein, during rotation of the cam between the neutral position and the second rotated position, the cam engages the second cam interface portion and thereby drives the indicator plate between the first position and the second position; and wherein at least a portion of the arm is visible via the backplate window when the cam is in the neutral position.

12. The method of claim 5, wherein one of the first locking position and the first unlocking position comprises a neutral position, and the other of the first locking position and the first unlocking position comprises a first rotated position;

wherein one of the second locking position and the second unlocking position comprises the neutral position, and the other of the second locking position and the second unlocking position comprises a second rotated position different from the first rotated position; and wherein confirming the direction of rotation of the cam by viewing at least a portion of the arm through a window in the backplate comprises viewing the at least a portion of the arm through the window when the cam is in the neutral position.

13. The trim of claim 11, wherein the cam interface is configured to prevent the indicator plate from moving the cam from the neutral position.

14. The trim of claim 11, wherein the cam interface is configured to prevent the indicator plate from moving the cam from the first rotated position and/or from the second rotated position.

15. The trim of claim 11, wherein the first cam interface portion is open to the second cam interface portion.

16. The trim of claim 11, wherein the cam comprises a single engagement portion operable to engage each of the first cam interface portion and the second cam interface portion.

17. The trim of claim 11, wherein the cam interface comprises an arcuate wall that is arcuate about a rotational axis of the cam.

* * * * *